(12) United States Patent
Clarke

(10) Patent No.: US 12,365,466 B1
(45) Date of Patent: Jul. 22, 2025

(54) POWER SWITCHING SYSTEM OF AN ANTI-ICE SYSTEM FOR USE WITH A MAIN POWER SUPPLY AND AN AUXILIARY POWER SUPPLY

(71) Applicant: General Electric Company, Schenectady, NY (US)

(72) Inventor: Brandon Christopher Clarke, Milford, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/419,876

(22) Filed: Jan. 23, 2024

(51) Int. Cl.
*B64D 15/12* (2006.01)
*B64D 15/22* (2006.01)
*F02C 7/047* (2006.01)
*H05B 1/02* (2006.01)

(52) U.S. Cl.
CPC ............ *B64D 15/12* (2013.01); *B64D 15/22* (2013.01); *F02C 7/047* (2013.01); *H05B 1/0236* (2013.01); *H05B 2214/02* (2013.01)

(58) Field of Classification Search
CPC ........ B64D 15/00; B64D 15/12; B64D 15/14; F02C 7/047
See application file for complete search history.

(56) References Cited

U.S. PATENT DOCUMENTS

| | | | |
|---|---|---|---|
| 3,002,718 A | 10/1961 | Hackenberger, Jr. | |
| 3,496,331 A | 2/1970 | Fleury et al. | |
| 4,410,794 A * | 10/1983 | Williams | B64D 15/14 219/486 |
| 5,131,812 A * | 7/1992 | Boyd | B64D 15/12 219/202 |
| 5,301,905 A | 4/1994 | Blaha | |
| 5,657,951 A | 8/1997 | Giamati | |
| 6,338,455 B1 * | 1/2002 | Rauch | H05B 3/16 244/134 R |
| 6,725,645 B1 | 4/2004 | Wadia et al. | |
| 7,513,458 B2 | 4/2009 | Layland et al. | |

(Continued)

OTHER PUBLICATIONS

Wikipedia, Ice Protection System, 6 pages. Retrieved Oct. 10, 2023 from weblink: https://en.wikipedia.org/wiki/Ice_protection_system.
(Continued)

*Primary Examiner* — Kyle Robert Thomas
(74) *Attorney, Agent, or Firm* — McCarter & English, LLP

(57) ABSTRACT

A power switching system can include a main power supply to provide power to electrical devices, such as electric heaters for ice protection during an aircraft operation. During a nominal mode of operation, a subset of electrical devices may be operated sufficiently based on the main power supply. The power switching system may further include an auxiliary power supply to supplement a main power supply for critical phases of operation, such as during takeoff, landing, or flight into known icing conditions. The auxiliary power supply can include a battery or supercapacitor that augments electrical power provided from the main power supply. When an auxiliary mode of operation is needed, such as during the critical phase of flight, an electrical power from an auxiliary power supply can be used to augment the main power supply so that all electrical devices are powered.

20 Claims, 19 Drawing Sheets

(56) References Cited

U.S. PATENT DOCUMENTS

| | | | |
|---|---|---|---|
| 7,546,980 B2 | 6/2009 | Giamati | |
| 7,556,221 B2* | 7/2009 | Hindel | B64D 15/12 |
| | | | 219/202 |
| 7,581,378 B2 | 9/2009 | Brand et al. | |
| 7,673,832 B2 | 3/2010 | Meister | |
| 7,874,161 B2 | 1/2011 | Williams | |
| 7,936,082 B2* | 5/2011 | Boudyaf | B64D 41/00 |
| | | | 219/202 |
| 8,061,657 B2 | 11/2011 | Rocklin et al. | |
| 8,181,900 B2 | 5/2012 | Chene et al. | |
| 8,209,953 B2 | 7/2012 | Winter et al. | |
| 9,193,466 B2 | 11/2015 | Calder et al. | |
| 9,638,044 B2 | 5/2017 | Gieras et al. | |
| 9,970,300 B2 | 5/2018 | Perkinson | |
| 10,442,523 B2* | 10/2019 | Khozikov | H05B 6/101 |
| 10,457,403 B2* | 10/2019 | Houlihan | H05B 1/0236 |
| 10,662,877 B2 | 5/2020 | Brown | |
| 10,710,732 B2 | 7/2020 | Aubert et al. | |
| 10,723,465 B2 | 7/2020 | Skoglund et al. | |
| 11,002,188 B2 | 5/2021 | Chilukuri | |
| 11,015,525 B2 | 5/2021 | Sellers | |
| 11,427,336 B2 | 8/2022 | Zadell et al. | |
| 2013/0266419 A1 | 10/2013 | Richardson et al. | |
| 2018/0080378 A1 | 3/2018 | Alecu | |
| 2019/0039742 A1 | 2/2019 | Gordon et al. | |
| 2020/0291783 A1* | 9/2020 | Picard | F01D 5/12 |
| 2021/0009274 A1* | 1/2021 | English | H05B 1/0236 |
| 2023/0294833 A1 | 9/2023 | Clarke et al. | |

OTHER PUBLICATIONS

NASA, A Pilot's Guide to In-Flight Icing, Course Overview and Main Menu, 5 pages. Retrieved Oct. 10, 2023 from Weblink: https://aircrafticing.gre.nasa.gov/1_1_0_0.html.

* cited by examiner

POWER SWITCHING SYSTEM OF AN ANTI-ICE SYSTEM FOR USE WITH A MAIN POWER SUPPLY AND AN AUXILIARY POWER SUPPLY

FIELD

The present disclosure relates to a power switching system, and more particularly, to a power switching system having a main power supply and an auxiliary power supply.

BACKGROUND

A gas turbine engine generally includes a turbomachine and a rotor assembly. Gas turbine engines, such as turbofan engines, may be used for aircraft propulsion, and in that regard may be subjected to in-flight icing conditions. In the event that icing conditions are present, ice buildup may occur on various components of the gas turbine engine, such as but not limited to the fan blades of an open rotor driven by the gas turbine engine. It is desirable to prevent ice build-up from occurring to preserve engine operating margin as well as performance. A main power supply may be used to provide partial power to an anti-ice system. Improvements to anti-ice systems would be useful in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
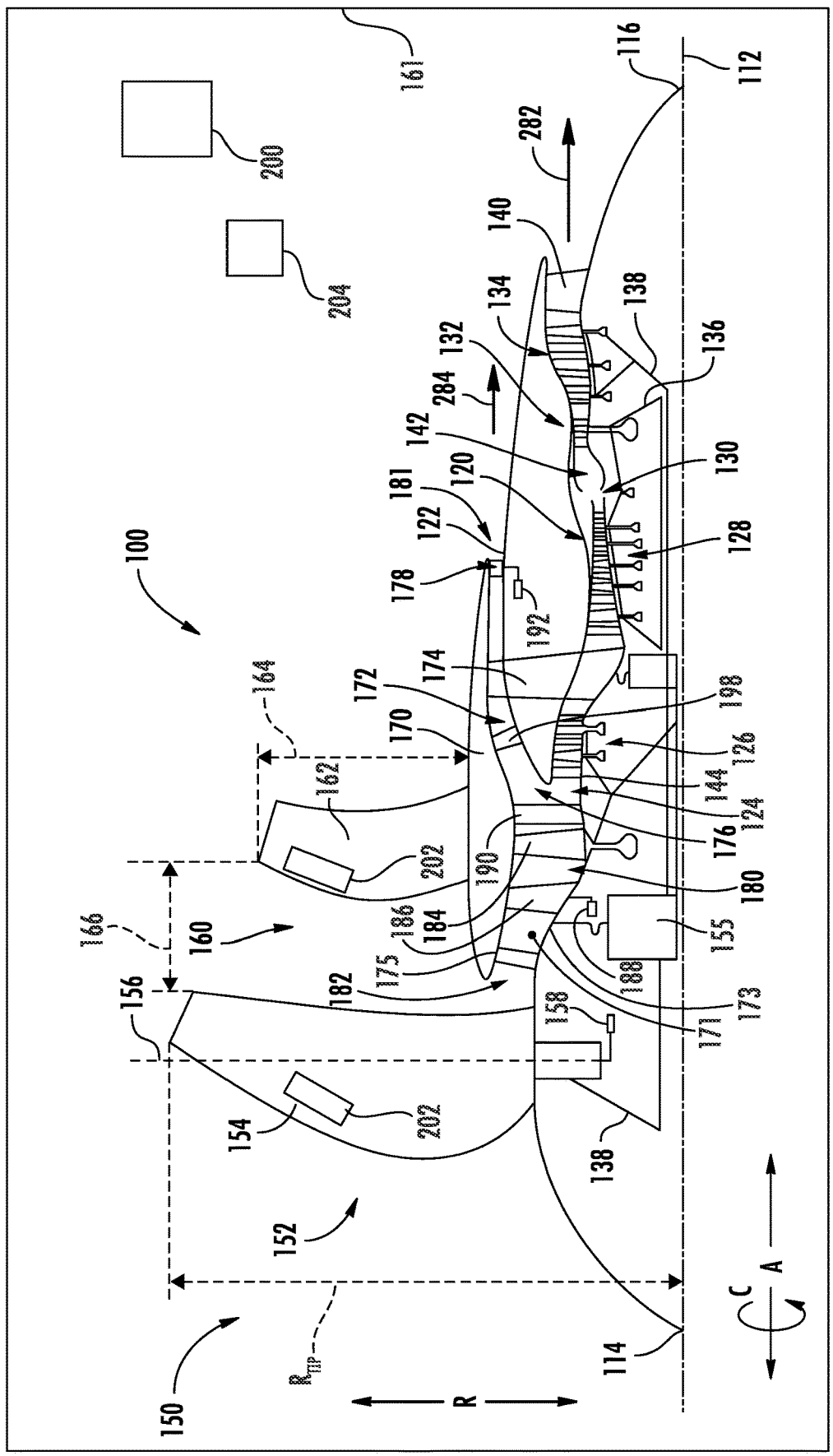
FIG. 1 is a cross-sectional view of a gas turbine engine useful for providing propulsive power to an aircraft in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "axial" and "axially" refer to directions and orientations that extend substantially parallel to a reference axis. Moreover, the terms "radial" and "radially" refer to directions and orientations that extend substantially perpendicular to the reference axis. In addition, as used herein, the terms "circumferential" and "circumferentially" refer to directions and orientations that extend arcuately about the reference axis.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first", "second", and "third" may be used interchangeably to distinguish one component from another and are not intended to signify location or importance of the individual components.

A "third stream" as used herein means a non-primary air stream capable of increasing fluid energy to produce a minority of total propulsion system thrust. The third stream may generally receive inlet air (air from a ducted passage downstream of a primary fan) instead of freestream air (as the primary fan would). A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

As will be discussed in more detail below, the subject matter of the present disclosure is directed generally to a power switching system that can be used to provide full power to electrical devices, such as electric heaters for ice protection, to supplement a main power supply. The power switching system can further include an auxiliary power supply such as a battery or supercapacitor that augments electrical power provided from the main power supply. During a nominal mode of operation, a subset of electrical devices may be operated sufficiently based on the main power supply. The power switching system may alternate providing electrical power at a first instance of time to a first subset of electrical devices while inhibiting electrical power being provided to a second subset of electrical devices, and then provide electrical power at a second instance of time to the second subset of electrical devices while inhibiting electrical power being provided to the first subset of electrical devices. When an auxiliary mode of operation is needed, such as during a critical phase of flight (e.g., takeoff, landing, flight into known icing conditions, etc.), an electrical power from an auxiliary power supply can be used to augment the main power supply so that all electrical devices are powered.

Referring now to FIG. 1, a schematic cross-sectional view of a gas turbine engine 100 is provided according to an example embodiment of the present disclosure. Particularly, FIG. 1 provides a turbofan engine having a rotor assembly with a single stage of unducted rotor blades. In such a manner, the rotor assembly may be referred to herein as an "unducted fan," or the entire gas turbine engine 100 may be referred to as an "unducted turbofan engine." In addition, the gas turbine engine 100 of FIG. 1 includes a third stream extending from the compressor section to a rotor assembly flowpath over the turbomachine, as will be explained in more detail below.

Though the embodiment of FIG. 1 illustrates a unducted turbofan engine, it will be appreciated that other types of gas turbine engines are contemplated herein for the discussion that follows. For example, it will be understood that turbojet engines, ducted turbofan engines, turboprop engines, gas turbine engines with centrifugal compressors, etc. are all contemplated for use with the various embodiments of inlet guide vanes depicted herein. No limitation is intended unless otherwise required as to the type of gas turbine engines useful with the inlet guide vanes described herein.

For reference, the gas turbine engine 100 defines an axial direction A, a radial direction R, and a circumferential direction C. Moreover, the gas turbine engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The gas turbine engine 100 extends between a forward end 114 and an aft end 116, e.g., along the axial direction A.

The gas turbine engine 100 includes a turbomachine 120 and a rotor assembly, also referred to a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor (referenced as an HP compressor 128 herein) receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The HP turbine 132 drives the HP compressor 128 through a high pressure shaft 136. In this regard, the HP turbine 132 drives the HP compressor 128. The high energy combustion products then flow to a low pressure turbine 134. The LP turbine 134 drives the LP compressor 126 and components of the fan section 150 through a low pressure shaft 138. In this regard, the LP turbine 134 drives the LP compressor 126 and components of the fan section 150. The LP shaft 138 is coaxial with the HP shaft 136 in this example embodiment. After driving each of the HP turbine 132 and the LP turbine 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. In such a manner, the gas turbine engine 100 may be referred to as an open rotor or open fan engine. In one form, the gas turbine engine 100 can be used as a prime mover for an aircraft 161 to provide propulsive power for the aircraft 161. In this manner, gas turbine engine 100 can be used to provide power to a propeller, or, in one other embodiment, a helicopter rotor.

As depicted, the fan 152 includes an array of fan blades 154 (only one shown in FIG. 1). The fan blades 154 are rotatable, e.g., about the longitudinal axis 112. As noted above, the fan 152 is driven by the low pressure turbine 134 via the LP shaft 138. For the embodiments shown in FIG. 1, the fan 152 is coupled with the LP shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a root and a tip and a span defined therebetween, and more specifically defines a tip radius RTIP from the longitudinal axis 112 to the tips of the fan blades 154 along the radial direction R. Each fan blade 154 defines a central blade axis 156. For this embodiment, each fan blade 154 of the fan 152 is rotatable about its central blade axis 156, e.g., in unison with one another. One or more actuators 158 are provided to facilitate such rotation and therefore may be used to change a pitch of the fan blades 154 about their respective central blades' axes 156.

The fan section 150 further includes an outlet guide vane array 162 that includes outlet guide vanes 162 (only one shown in FIG. 1; sometimes also referred to as fan guide vanes) disposed around the longitudinal axis 112. For this embodiment, the outlet guide vanes 162 are not rotatable about the longitudinal axis 112. Each outlet guide vane 162 has a root and a tip and a span defined therebetween. The outlet guide vanes 162 may be unshrouded as shown in FIG. 1 or, alternatively, may be shrouded, e.g., by an annular shroud spaced outward from the tips of the outlet guide vanes 162 along the radial direction R or attached to the outlet guide vanes 162.

As will be appreciated, the outlet guide vanes 162 each define an outlet guide vane (OGV) span 164 along the radial direction R from a root to a tip. Additionally, the outlet guide vanes 162 are spaced from the fan blade 154 along the axial direction A by a distance or spacing 166. The spacing 166 is measured from an aft-most edge of the fan blade 154 to a forward-most edge of the outlet guide vanes 162 along the axial direction A.

In the embodiment depicted, as noted above, each outlet guide vane 162 is configured as a fixed guide vane, unable to be pitched about a central blade axis of the outlet guide vane 162. The outlet guide vanes 162 are thus mounted to a fan cowl 170 in a fixed manner.

It will be appreciated, however, that in other embodiments, the outlet guide vanes 162 may alternatively be variable pitch outlet guide vanes 162.

As shown in FIG. 1, in addition to the fan 152, which is unducted, a ducted fan 184 is included aft of the fan 152, such that the gas turbine engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan 184 is rotatable about the same axis (e.g., the longitudinal axis 112) as the fan blade 154. The ducted fan 184 is, for the embodiment depicted, driven by the low pressure turbine 134 (e.g. coupled to the LP shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1) arranged in a single stage, such that the ducted fan 184 may be referred to as a single stage fan. The fan blades of the ducted fan 184 can be arranged in equal spacing around the longitudinal axis 112. Each blade of the ducted fan 184 has a root and a tip and a span defined therebetween.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan flowpath or fan duct 172 may be understood as forming at least a portion of the third stream of the gas turbine engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing through the fan duct 172. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The gas turbine engine 100 also defines or includes an inlet duct 180. The inlet duct 180 extends between the engine inlet 182 and the core inlet 124/fan duct inlet 176. The engine inlet 182 is defined generally at the forward end of the fan cowl 170 and is positioned between the fan 152 and the outlet guide vane array 160 along the axial direction A. The inlet duct 180 is an annular duct forming an annular flow path 171 that is positioned inward of the fan cowl 170 along the radial direction R. The annular flow path 171 includes an inner flow surface 173 and an outer flow surface 175, where the inner flow surface 173 is radially inward from the outer flow surface 175 such that the inner flow surface 173 is on a shaft side of the annular flow path 171 (e.g., the inner flow surface 173 is closer to the LP shaft 138 than the outer flow surface 175). Air flowing downstream along the inlet duct 180 is split, not necessarily evenly, into the core duct 142 and the fan duct 172 by a fan duct splitter or leading edge 144 of the core cowl 122. In the embodiment depicted, the inlet duct 180 is wider than the core duct 142 along the radial direction R. The inlet duct 180 is also wider than the fan duct 172 along the radial direction R.

Notably, for the embodiment depicted, the gas turbine engine 100 includes one or more features to increase an efficiency of a third stream thrust, $Fn_{3S}$ (e.g., a thrust generated by an airflow through the fan duct 172 exiting through the fan exhaust nozzle 178, generated at least in part by the ducted fan 184). In particular, the gas turbine engine 100 further includes an array of inlet guide vanes 186 positioned in the inlet duct 180 upstream of the ducted fan 184 and downstream of the engine inlet 182. As will be appreciated, the inlet guide vanes 186 can be used to maintain operability of the compressor. The array of inlet guide vanes 186 are arranged around the longitudinal axis 112. For this embodiment, the inlet guide vanes 186 are not rotatable about the longitudinal axis 112. Each inlet guide vanes 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vanes 186 may be fixed or unable to be pitched about its central blade axis.

Further, located downstream of the ducted fan 184 and upstream of the fan duct inlet 176, the gas turbine engine 100 includes an array of outlet guide vanes 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the gas turbine engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the fan exhaust nozzle 178 may result in a more efficient generation of third stream thrust, $Fn_{3S}$, during one or more engine operating conditions. Further, by introducing a variability in the geometry of the inlet guide vanes 186 and the fan exhaust nozzle 178, the gas turbine engine 100 may be capable of generating more efficient third stream thrust, $Fn_{3S}$, across a relatively wide array of engine operating conditions, including takeoff and climb (where a maximum total engine thrust $Fn_{Total}$, is generally needed) as well as cruise (where a lesser amount of total engine thrust, $Fn_{Total}$, is generally needed).

Moreover, referring still to FIG. 1, in exemplary embodiments, air passing through the fan duct 172 may be relatively cooler (e.g., lower temperature) than one or more fluids utilized in the turbomachine 120. In this way, one or more heat exchangers 198 may be positioned in thermal communication with the fan duct 172. For example, one or more heat exchangers 198 may be disposed within the fan duct 172 and utilized to cool one or more fluids from the core engine with the air passing through the fan duct 172, as a resource for removing heat from a fluid, e.g., compressor bleed air, oil or fuel.

Although not depicted, the heat exchanger 198 may be an annular heat exchanger extending substantially 360 degrees in the fan duct 172 (e.g., at least 300 degrees, such as at least 330 degrees). In such a manner, the heat exchanger 198 may effectively utilize the air passing through the fan duct 172 to cool one or more systems of the gas turbine engine 100 (e.g., lubrication oil systems, compressor bleed air, electrical components, etc.). The heat exchanger 198 uses the air passing through the fan duct 172 as a heat sink and correspondingly increases the temperature of the air downstream of the heat exchanger 198 and exiting the fan exhaust nozzle 178.

It will be appreciated, that for the purposes of discussion in the present disclosure, the ducted fan 184, the fan cowl 170, the inlet duct 180, and the fan duct 172 may all be considered part of the turbomachine 120.

It will be appreciated that the exemplary gas turbine engine 100 depicted in FIG. 1 (depicted as a turbofan) is provided by way of example only, and that in other embodiments, the gas turbine engine 100 may have any other suitable configuration. For example, in other embodiments, the gas turbine engine 100 may not include the fan duct 172 (e.g., the third stream), and as such may be configured as a "two stream" engine. Additionally, or alternatively, in other embodiments, the gas turbine engine 100 may be configured as a direct drive engine (e.g., without the speed reduction gearbox 155), as a fixed-pitch engine (e.g., without the actuator 158), etc.

The gas turbine engine 100 further includes an engine controller 200 useful to regulate operation of one or more aspects of the gas turbine engine 100, such as a delivery of fuel to the combustor 130, operation of the actuator 158 to rotate the fan blade 154 of the fan 152 about its central blade axis 156, etc. The engine controller 200 can be in communication with an aircraft controller or any other type of controller useful to receive data and/or operate any system associated with the aircraft 161 (e.g., a control surface actuator, landing gear position, etc.).

The gas turbine engine 100 includes electrical devices 202 in the form of heating elements useful to prevent, mitigate, or minimize ice formation on the fan blade 154 and the outlet guide vane 162. As suggested above, the electrical devices 202 could also be used in other embodiments to prevent, mitigate, or minimize ice formation on a propeller, or helicopter rotor, compressor blades, etc. As such, the electrical devices 202 can be used to remove ice from a plurality of air moving blades, whether the air moving blades are the fan blades 154, or are blades of a propeller or helicopter rotor. In some forms, the electrical devices can more generally be used on any aircraft surface which may collect ice, and not just an air moving blade. Accordingly, the electrical devices 202 can be used to prevent, mitigate, or minimize ice formation on an aircraft surface, where aircraft can include a fixed-wing aircraft, rotor-blade aircraft (e.g., helicopter), glider, dirigible, etc. Though the following disclosure will, for ease of convenience, focus on ice protection in an aviation setting, it will be appreciated that the disclosure is equally applicable to non-aviation related applications including wind turbine blades or other systems requiring ice protection. Still further, though the instant disclosure is directed to electrical systems useful to prevent, mitigate, or minimize ice formation on the fan blades 154 and/or outlet guide vanes 162, it will be appreciated that other aircraft surfaces can also be protected using the power switching system. For example, the instant disclosure can be applied to helicopter rotor blades, aircraft nacelle inlets or boosters, heat exchangers, aircraft wings, aircraft empennage, control surfaces, and/or antennas.

The electrical devices 202 may include one or more heating elements as well as any associated electronics, such as power converters, necessary to operate the heating element(s). Thus the electrical devices 202 can include a heating element (or any other useful device that receives electrical energy to produce a useful result, such as a fluid valve and/or pump for flowing and/or pumping anti-icing fluid such as glycol, or a pneumatic valve and/or pneumatic pump for pressuring and/or pumping fluid such as air to actuate pneumatically powered de-icing boots) as well as any potentially ancillary components such as an electrical circuit helpful to convert electrical energy into a useful result. In some embodiments, the electrical device 202 only includes the device that receives electrical energy to produce a useful result (e.g., an electric heater for thermally removing ice (e.g., the electric heater adds heat to a surface to discourage the formation of ice and/or encourage the shedding of ice through melting), a glycol valve and/or pump for pumping anti-icing fluid (e.g., seeping glycol through apertures formed on a surface of an aircraft surface to discourage formation of ice), a pneumatic valve and/or pump for pressure actuated de-icing boots (e.g., temporarily altering geometry of a de-icing boot to fracture ice formed on an aircraft surface)). FIG. 1 depicts, in schematic form, electrical devices 202 located at each of the fan blade 154 and outlet guide vane 162, but it will be understood that one or more portions of the electrical devices 202 may be located elsewhere. For example, the heating element may be located at the fan blade 154 and outlet guide vane 162, while any associated electrical circuit can be located elsewhere but otherwise in electrical communication with the heating element. The gas turbine engine 100 can include a plurality of fan blades 154 and outlet guide vanes 162 each including one or more electrical devices 202 useful to prevent ice formation. In some applications, only the fan blades 154 or only the outlet guide vanes 162 may include the electrical devices 202.

A power controller 204 can be used to regulate operation of the electrical devices 202 by delivering electrical power to the electrical devices 202. For example, the power controller 204 can be used to deliver power to an electric circuit connected to a heater of the electrical device 202, or can be used to deliver electric power direct to the heater in the case in which the electrical device 202 only includes the heater and no associated electrical circuit. Embodiments of the power controller 204 and electrical devices 202 are described further below.

Figure 2:
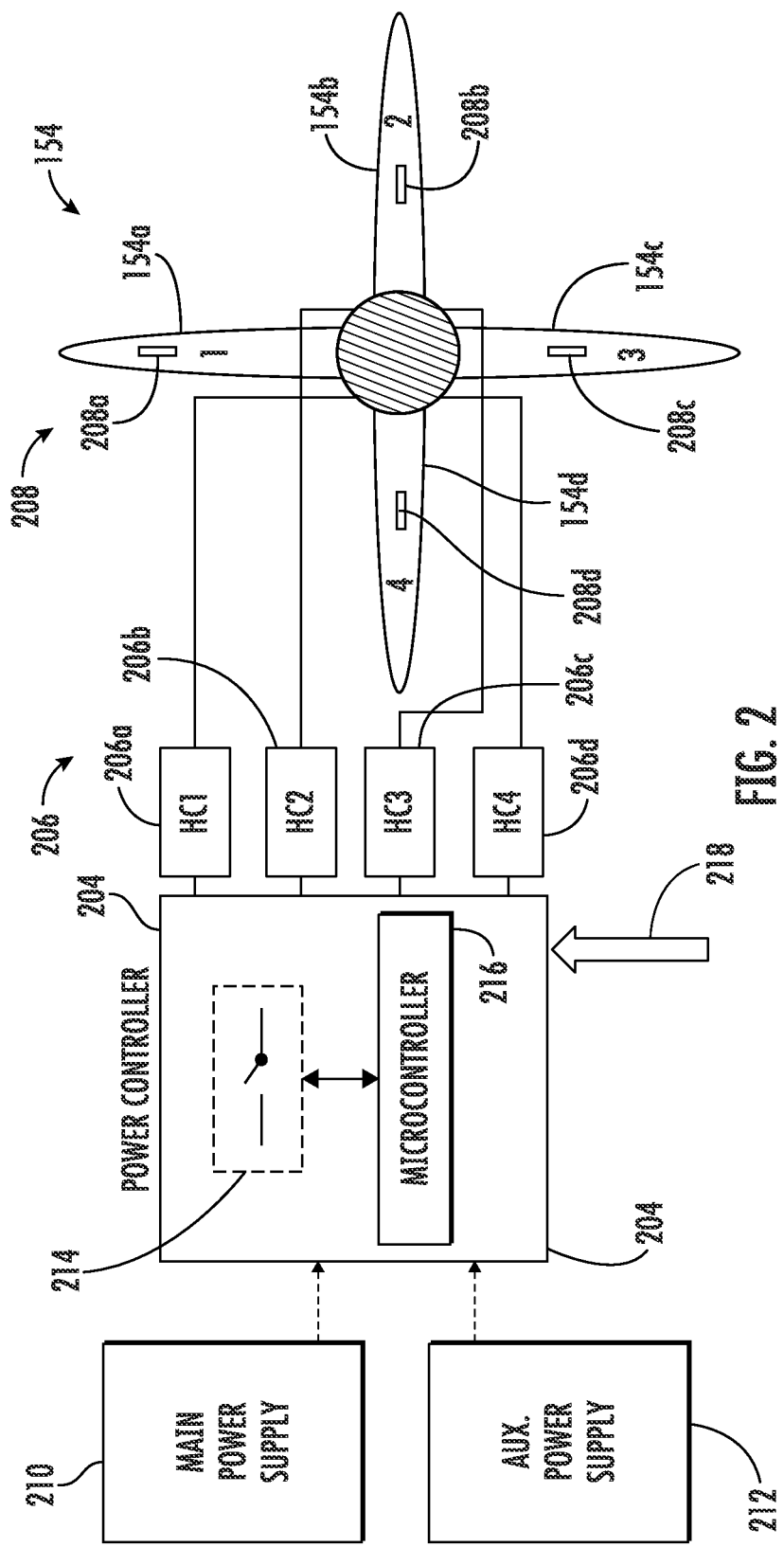
FIG. 2 is a schematic of a power switching system in accordance with another exemplary aspect of the present disclosure.

Turning now to FIG. 2, a configuration of the unducted fan 152 is illustrated which includes four fan blades 154a-154d. It will be appreciated that in other embodiments more, or fewer, fan blades 154 may be present. Several heater circuits (e.g., HC1 206a, HC2 206b, HC3 206c, and HC4 206d) are depicted in electrical communication with heating elements 208a-208d. The electrical devices 202 comprise the heater circuits 206a-206d and heating elements 208a-208d. Each heating element 208a-208d is depicted as associated with each of the heater circuits 206a-206d. Other embodiments, however, may include fewer heater circuits 206 for the number of heating elements 208. For example, in some applications two or more heating elements 208 can be driven by a single heater circuit 206.

The heating elements 208 receive, via action of the power controller 204, electrical power from one or both of the main power supply 210 and an auxiliary power supply 212. The main power supply 210 can take a variety of forms, including an electric generator powered by the gas turbine engine 100. For example, in such an embodiment, the electric generator can be driven directly from a spool of the gas turbine engine, such as through a power offtake from the low pressure spool. The auxiliary power supply 212 can also take a variety of forms, including any suitable energy storage device such as a battery, supercapacitor, etc.

The power controller 204 is structured to receive electrical power from either or both of the main power supply 210 and auxiliary power supply 212 and deliver the power to one or more of the electrical devices 202 for purposes of energizing the electrical devices 202. The power controller 204 is structured to deliver the power directly to the electrical devices 202, and can, in some embodiments such as those discussed above, be used to convert the power prior to delivery to the one or more of the electrical devices 202.

The embodiment of the power controller 204 illustrated in FIG. 2 includes one or more switches 214 useful to direct and/or redirect electrical power from one or both of the main power supply 210 and auxiliary power supply 212 to one or more of the electrical devices 202. The one or more switches 214 can take any variety of forms depending on the application. For example, in some voltage and current ranges the switches 214 can take the form of a relay, such as, but not limited to, an electromechanical relay, solid state relay, hybrid relay, reed relays, etc. Other types of switches are also contemplated. Although the power controller 204 is depicted as including switches 214 in the illustrated embodiment, in other embodiments the power controller 204 can include additional electric circuitry, such as, but not limited to, power converters (e.g., a power converter used to drive a heating element of the electrical device 202).

The power controller 204 can also include a microcontroller 216 useful to operate the one or more switches 214. The microcontroller 216 can be any device suitable to operate the switches 214 on the basis of input 218. The microcontroller 216 can be a computing device, such as an integrated circuit, useful to receive the input 218 and regulate the configuration of one or more of the switches 214 to any given position. In some forms the microcontroller 216 can be replaced with any device suitable to receive the input 218 and regulate the switches 214. The input 218 can be a command received from a user (e.g., a pilot) useful by the power controller 204 to regulate the configuration of the switches 214 to any given position, or a command received from another controller which is useful by the power controller 204 to regulate the configuration of the switches 214 to any given position, or can be data useful by the power controller 204 to regulate the configuration of the switches 214 to any given position. Further examples of inputs useful by the power controller 204 to regulate the configuration of the switches 214 to any given position is provided further below in FIG. 5.

Figure 3:
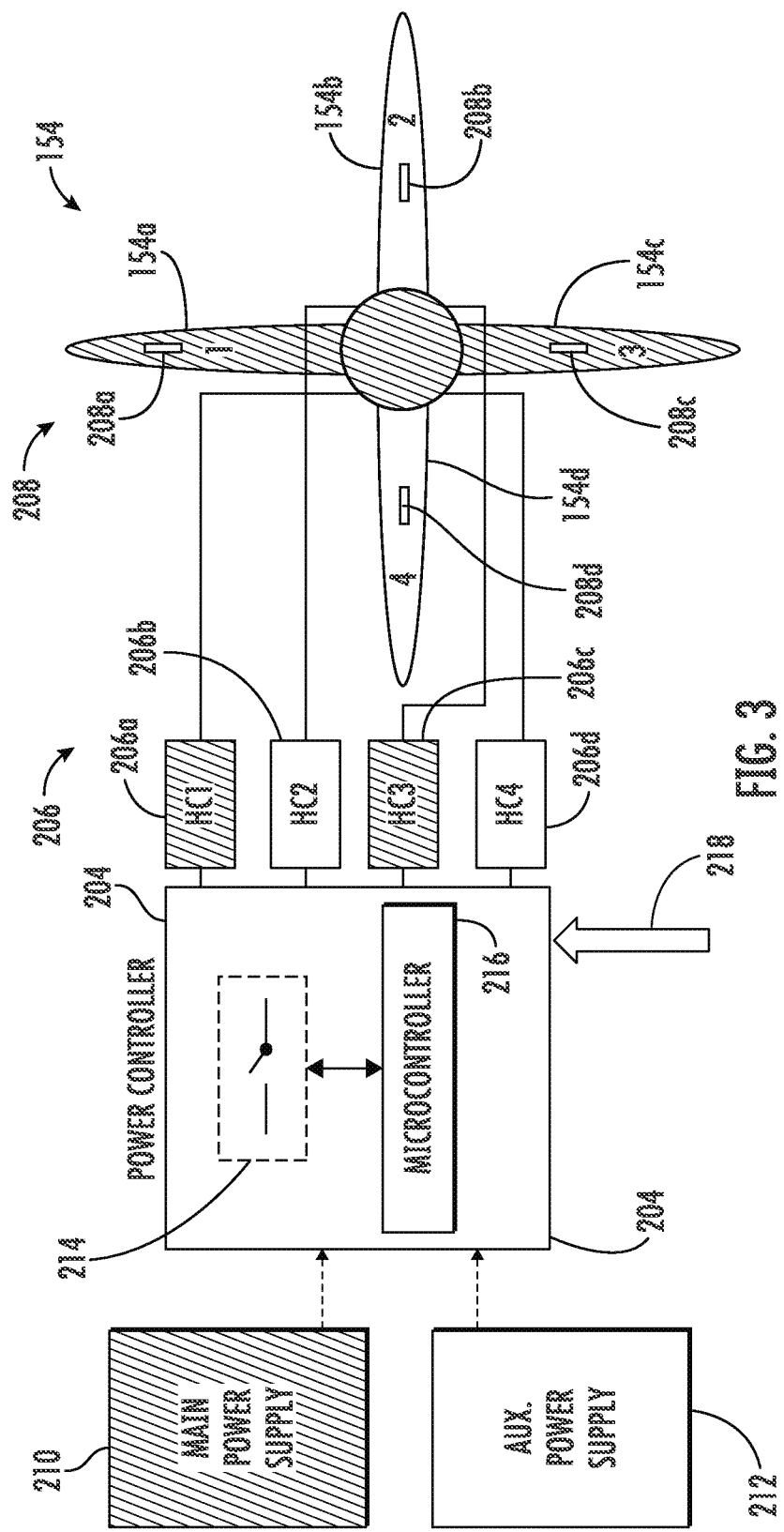
FIG. 3 is a schematic view of a power switching system activated to provide power to a subset of electrical devices in accordance with another exemplary aspect of the present disclosure.

FIG. 3 illustrates a configuration in which the power controller 204 has regulated the configuration of the switches 214 such that the heater circuit 206a and heating element 208a are energized, along with heater circuit 206c and heating element 208c. Fan blades 154a and 154c are shaded in the illustration to depict that those fan blades are receiving electrically produced heat. The power controller 204 has regulated the configuration of the switches 214 such that the heater circuit 206b and heating element 208b are not energized, and also heater circuit 206d and heating element 208d are not energized. Fan blades 154b and 154d are not shaded in the illustration to depict that those fan blades are not receiving electrically produced heat.

As illustrated, the auxiliary power supply 212 is not used in the example depicted in FIG. 3. The power controller 204 is configured in FIG. 3 to alternate the heating of the fan blades 154 between heating element 208a and heating element 208c on the one hand, and heating element 208b and 208d on the other. Operation of heating devices on propellers by alternating between different heating elements has been used on prior art devices. In the instant disclosure, alternating can be driven by constraints imposed upon how much electrical power can be drawn from the main power supply 210 and/or how much power can be provided through the power controller 204 for the supply of power from only the main power supply 210. The constraints can be related to a maximum electrical current for one or more components associated with the power controller 204, and/or can be related to an operational power budget associated with the main power supply 210 as it extracts mechanical power from the gas turbine engine 100, converts the mechanical power to electrical power, and then delivers electrical power to the power controller 204 and electrical device 202. For example, if the gas turbine engine 100 includes a constraint having an operational power extraction budget of, say, 15 Kilowatts (KW), such a constraint will prohibit simultaneous operation of all electrical devices 202 by the power controller 204 in embodiments in which required power delivery is 30 KW to operate all electrical devices 202 at the same time. Higher constraints of powering a subset of the electrical devices 202 is also contemplated, including, but not limited to, 50 KW, 75 KW, 100 KW, and 125 KW, to set forth just a few non-limiting examples. Thus, the power controller 204, can be configured to alternate the excitation of one or more electrical devices 202. In the illustrated embodiment of FIG. 3, the power controller 204 is configured to alternate excitation of the heater circuits 206a and 206c from the main power supply 210 for a first instance of time, and then switch to excitation of heater circuits 206b and 206d-from the main power supply 210 for a second instance of time. The instances of time can be at a regular interval, but in other embodiments can be driven by operational requirements that alter the regular interval.

As will be appreciated from the discussion above, the power controller 204 can be configured to alternate excitation of subsets of electrical devices 202. The power controller 204 can be configured to inhibit the supply of power to one subset of electrical devices 202 while delivering electrical power to another of the subsets of electrical devices 202. The power controller 204 can be configured to inhibit the transfer of electrical power through any variety of techniques, including programmatic techniques as in the case of a controller-based regulation of the electrical devices 202 (e.g., through the microcontroller 216), and/or mechanical interlock between switches 214 used to mechanically connect one subset of electrical devices 202 while concurrently disconnecting through the mechanical interlock another subset of electrical devices 202.

The illustrated embodiment depicted a total of four fan blades 154 which resulted in a first subset of electrical devices electrically powered from the main power supply 210 at a first instance of time and a second subset of electrical devices electrically powered from the main power supply 210 at a second instance of time. Since the instant disclosure is applicable to any number of fan blades, the alternating subsets can include any number of electrical devices. For example, in one embodiment, each of the first subset of electrical devices and second subset of electrical devices can include a single heating element 208, or can include more than one heating element 208. Furthermore, some embodiments may include a different number of heating elements 208 between each of the two subsets of electrical devices 202. Still further, more than two subsets of electrical devices 202 are envisioned in some embodiments.

Figure 4:
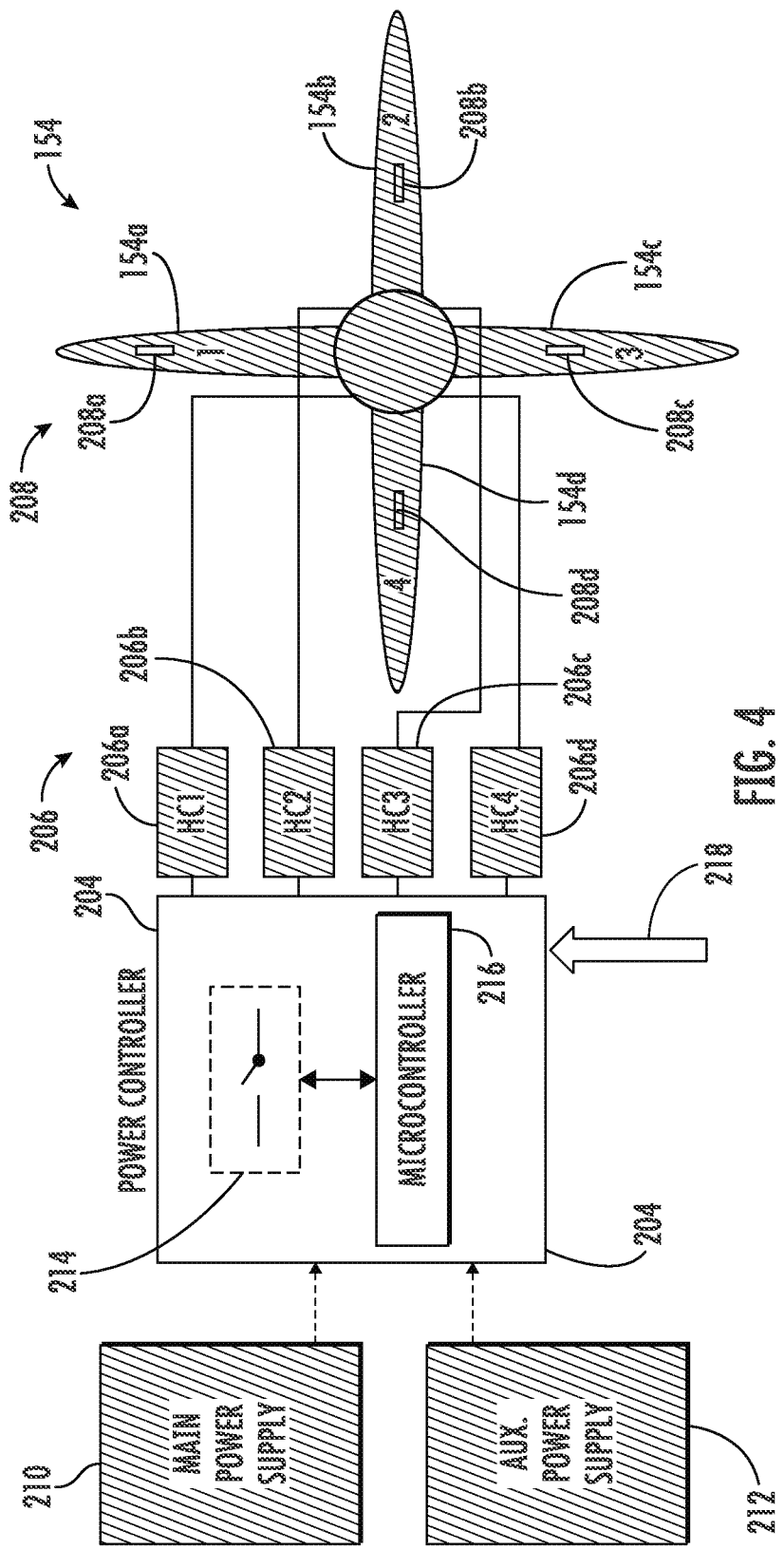
FIG. 4 is a schematic view of a power switching system activated to provide power to all electrical devices in accordance with another exemplary aspect of the present disclosure.

Turning now to FIG. 4, both the main power supply 210 and auxiliary power supply 212 are used together such that all heating elements 208 can be provided excitation power at the same time. The operation of the power controller 204 to either alternate between when each subset of electrical device is powered and when each subset is not powered, or to power each subset of electrical devices at the same time, can be made on the basis of the input 218 and, in those embodiments having a controller such as microcontroller 216, on the basis of the interpretation of the input with the microcontroller 216. The power controller 204 can be configured such as to place the main power supply 210 in serial power relationship with the auxiliary power supply 212 in one embodiment to provide sufficient power to drive all electrical devices 202 simultaneously, while in other embodiments the power controller 204 can be configured to place the main power supply 210 in electrical communication with one subset of electrical devices 202 and auxiliary power supply 212 in separate electrical communication with another subset of electrical devices 202. In those embodiments in which each of the main power supply 210 and auxiliary power supply 212 are placed in separate electrical communication with the different subsets of electrical devices 202, the power controller 204 can continue the alternating schema described above with FIG. 3 in which each of the main power supply 210 and auxiliary power supply 212 switch back and forth between the subsets of electrical devices 202. In another embodiment in which each of the main power supply 210 and auxiliary power supply 212 are placed in separate electrical communication with the different subsets of electrical devices 202, the schema described above in FIG. 3 can be halted and the main power supply 210 can provide electrical power, through the power controller 204, with one of the subsets of electrical devices 202 and the auxiliary power supply 212 can provide electrical power, through the power controller 204, with another of the subsets of electrical devices 202 until such time as the input 218 dictates a return to the alternating schema of FIG. 3.

Figure 5:
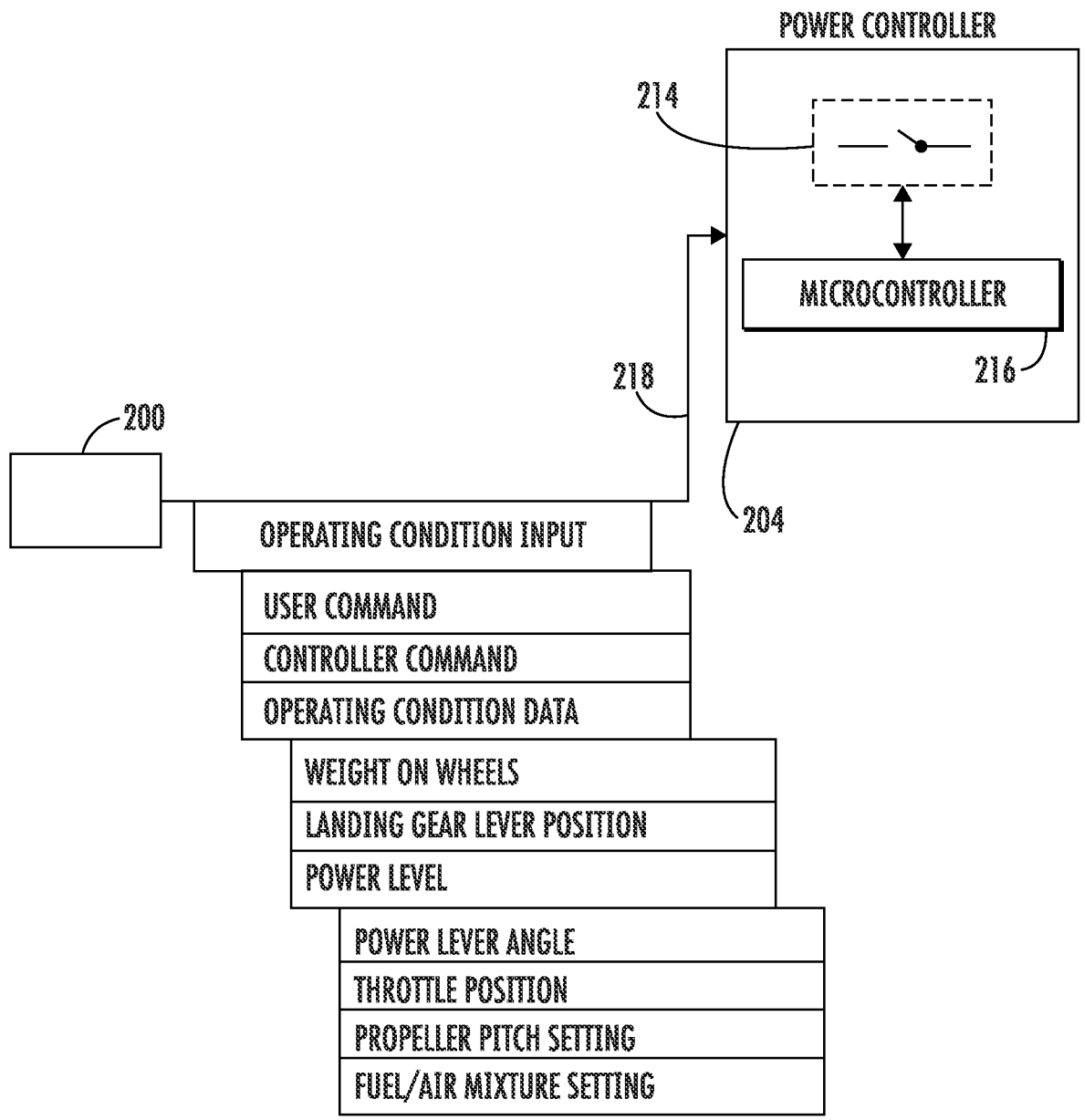
FIG. 5 is a schematic view of an input being provided to a power controller in accordance with another exemplary aspect of the present disclosure.

FIG. 5 depicts an embodiment in which the engine controller 200 sends input 218 to the power controller 204. In other embodiments, the input 218 can be provided directly from a user, or can originate from another controller or computing device. For example, in alternative and/or additional forms, the power controller 204 can receive the input 218 via a data bus. The input 218 is illustrated in FIG. 5 is an operating condition input which can include one or more different data values. The operating condition input depicted in FIG. 5 several different data values, but it will be appreciated that fewer data values are also contemplated in some embodiments. The operating condition input can include a user command such as might be sensed from a button or lever activated by a pilot. The operating condition input can alternatively and/or additionally include a controller command that is generated from another controller. For example, the engine controller 200 may determine that the power switching system should be transitioned from operating according to the embodiment of alternating excitation in FIG. 3 to the embodiment of full excitation of FIG. 4, in which case a command can be generated by the engine controller 200 and transmitted as part of the operating condition input. The operating condition input can alternatively and/or additionally include operating condition data useful by the power controller 204 to determine whether the power switching system should be transitioned from operating according to the embodiment of alternating excitation in FIG. 3 to the embodiment of full excitation of FIG. 4. The operating condition data can include one or more of data related to whether an aircraft is being supported on the ground with landing gear (a so-called "weight on wheels" indication), a landing gear lever position related to a pilot command to deploy or retract the landing gear, and a power level that indicates the extent to which power is being requested or delivered, or impacted by ancillary engine systems. For example, the power level can include any one of a power lever angle (e.g., the angle at which a throttle is positioned in a cockpit), a throttle position (e.g., for piston driven internal combustion engine powerplants), a propeller pitch setting, or a fuel/air mixture setting (e.g., as sensed and/or commanded by the engine controller 200). The operating condition data can also include sensor data from an ice detection sensor configured to determine the presence of ice. Data from the ice detection sensor can include a binary (0 representing insufficient ice, 1 representing sufficient ice to trigger the system) or a value that can be compared against a threshold. The operating condition data can also include ambient temperature or system fault detection flags/data. Still further, the operating condition input can alternatively and/or additionally include any of an ambient temperature, a master control switch position, and an indication related to the state of charge of the auxiliary power supply 212.

The power switching system as disclosed herein can be used to configure the heating elements 208 to prevent ice formation, and when it is desired to ensure no ice buildup if operating in the alternating configuration of FIG. 3, the auxiliary power supply 212 can be used, in conjunction with a configuration change of the power controller 204, to supplement power delivery to aid in heating a subset of heating elements 208 that were not already being heated by the main power supply 210. Conditions that warrant operating in the configuration of FIG. 4 include during critical phases of flight, such as takeoff and landing, and/or flight into known icing conditions. In such a situation, the pilot can command the power switching system to operate as in the embodiment of FIG. 4, and/or the engine controller 200 (or a controller in communication with either the engine controller 200 or the power controller 204) can detect operation in a critical phase of flight and command the power switching system to operate as in FIG. 4. Detecting an operation in a critical phase of flight (takeoff, landing, flight into known icing conditions, etc.) can be accomplished using any one or more of the operating condition inputs illustrated in FIG. 5. For example, the power controller 204 can determine a critical phase of flight, and therefore configure for operation as in FIG. 4, by evaluating a landing gear lever position in the down position, power lever angle reduced to flight idle, weight on wheels indicating still in flight. If these three conditions are met, the power controller 204 can configured as in FIG. 4. Likewise, if a landing gear lever position in the down position, power lever angle reduced to ground idle, and weight on wheels is indicating the aircraft is on the ground, the power controller 204 can configure the power switching system to operate according to FIG. 3, or, alternatively, to shut the system OFF so that no power is delivered to any of the electrical devices 202. Yet still further, if the power controller 204 detects that ambient temperature exceeds a pre-defined operating temperature, the power controller 204 can be configured to inhibit operation of the electrical devices 202. Similarly, if the power controller 204 detects a system fault flag/data, the power controller 204 can be configured to inhibit operation of the electrical devices 202

Figure 6:
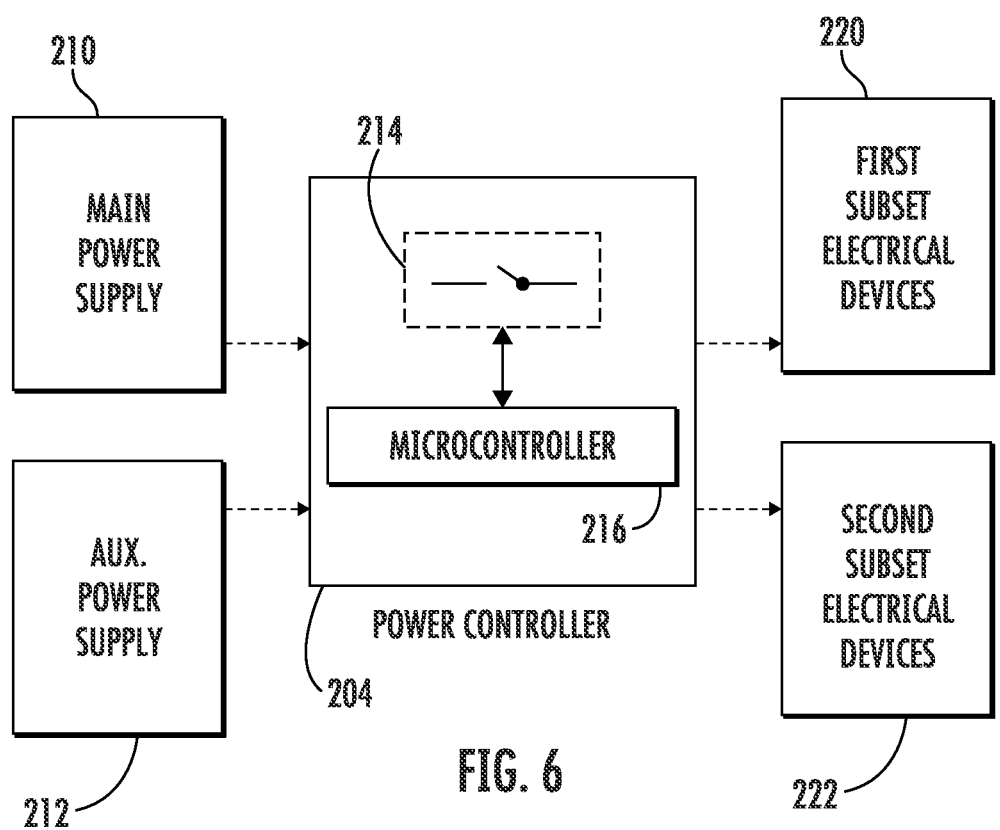
FIG. 6 is a schematic view of a power switching system having a power controller and at least one switch in accordance with another exemplary aspect of the present disclosure.

FIG. 6 is a schematic of embodiments discussed above which include a first subset of electrical devices 220 and a second subset of electrical devices 222. The power switching system operates by receiving power from either or both of the main power supply 210 and auxiliary power supply 212, and delivering the electrical power to one or both of the first subset of electrical devices 220 and second subset of electrical devices 222. Although the heater circuits 206 are not depicted in FIG. 6, it will be appreciated that the electrical devices 202 include the heater circuits 206 and heating elements 208 in those embodiments which require heater circuits 206. It will also be appreciated that the heater circuits 206 can be included in the power controller 204. Thus, the schematic in FIG. 6 is used for general description and is not intended to be limited to all embodiments described herein.

Figure 7:
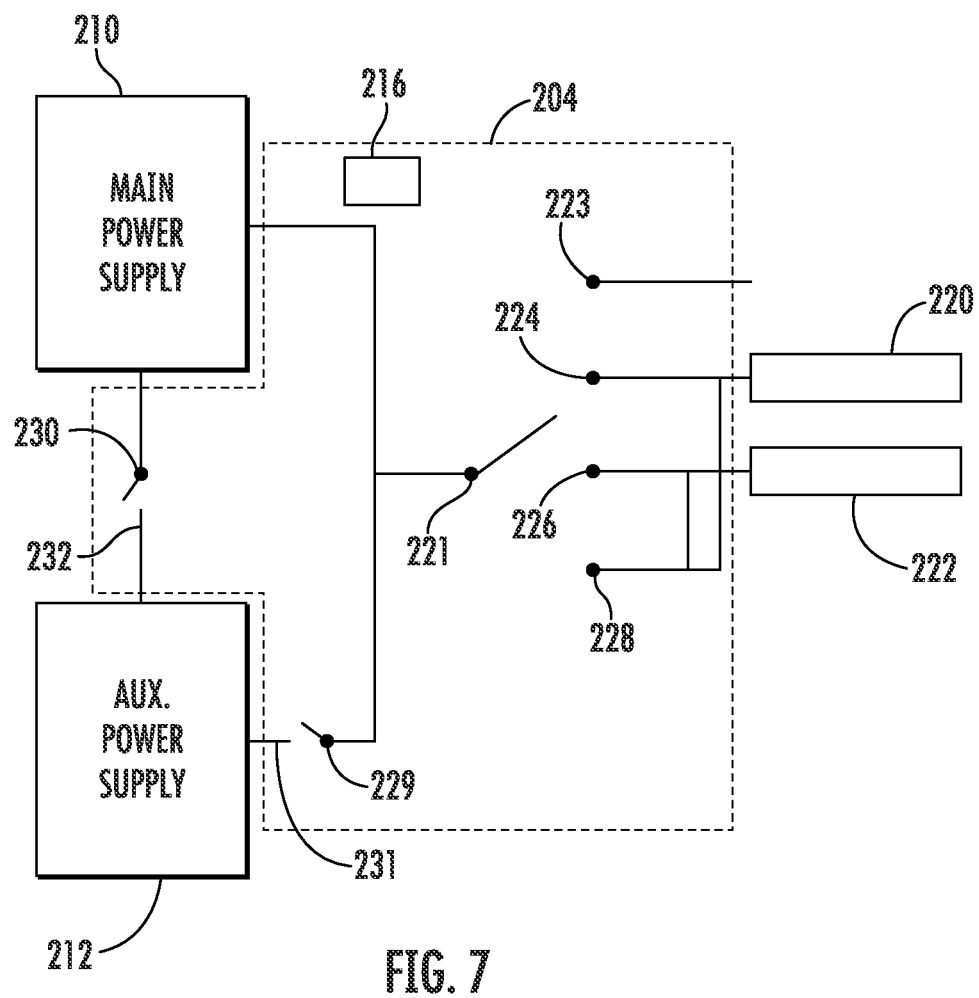
FIG. 7 is a schematic view of a power switching system having a power controller in accordance with another exemplary aspect of the present disclosure.

Turning now to FIGS. 7-11, further details of the power controller 204 are depicted in which the main power supply 210 and auxiliary power supply 212 are arranged in parallel to provide power to either, or both, of the first subset of electrical devices 220 and second subset of electrical devices 222. The switch 214 represented schematically in FIG. 6 is broadly representative of switches 221, 229, and 230, all of which can be regulated by the microcontroller 216. A main selector switch 221 can be used to provide electrical power to the parallel configuration of the main power supply 210 and the auxiliary power supply 212. Electrical contacts 223-228 are used in conjunction with the main selector switch 221 to place the main power supply 210 and auxiliary power supply 212 in electrical communication with either, or both, of the first subset of electrical devices 220 and second subset of electrical devices 222. A charge switch 230 is provided which can make contact with charge electrical contact 232 to charge the auxiliary power supply 212. The auxiliary power supply 212 can be charged, in some embodiments, when the main power supply 210 is not provided power to any of the electrical devices 220 and 222. In embodiments in which the main power supply is capable of providing excess power beyond that required to excite the electrical devices as in FIG. 3, the auxiliary power supply 212 can be charged during the alternating operation as in FIG. 3. In any of the embodiments herein, the auxiliary power supply 212 can be charged from a ground power unit (GPU) or other external source. For example, the auxiliary power supply 212 can be charged while the aircraft is on the ground before departure. The power controller 204 further includes an auxiliary disconnect switch 229 that can make contact with auxiliary electrical contact 231 if auxiliary electrical power is desired to be delivered from the auxiliary power supply 212. Further operating scenarios of the embodiment depicted in FIG. 7 are described further below in FIGS. 8-11.

Figure 8:
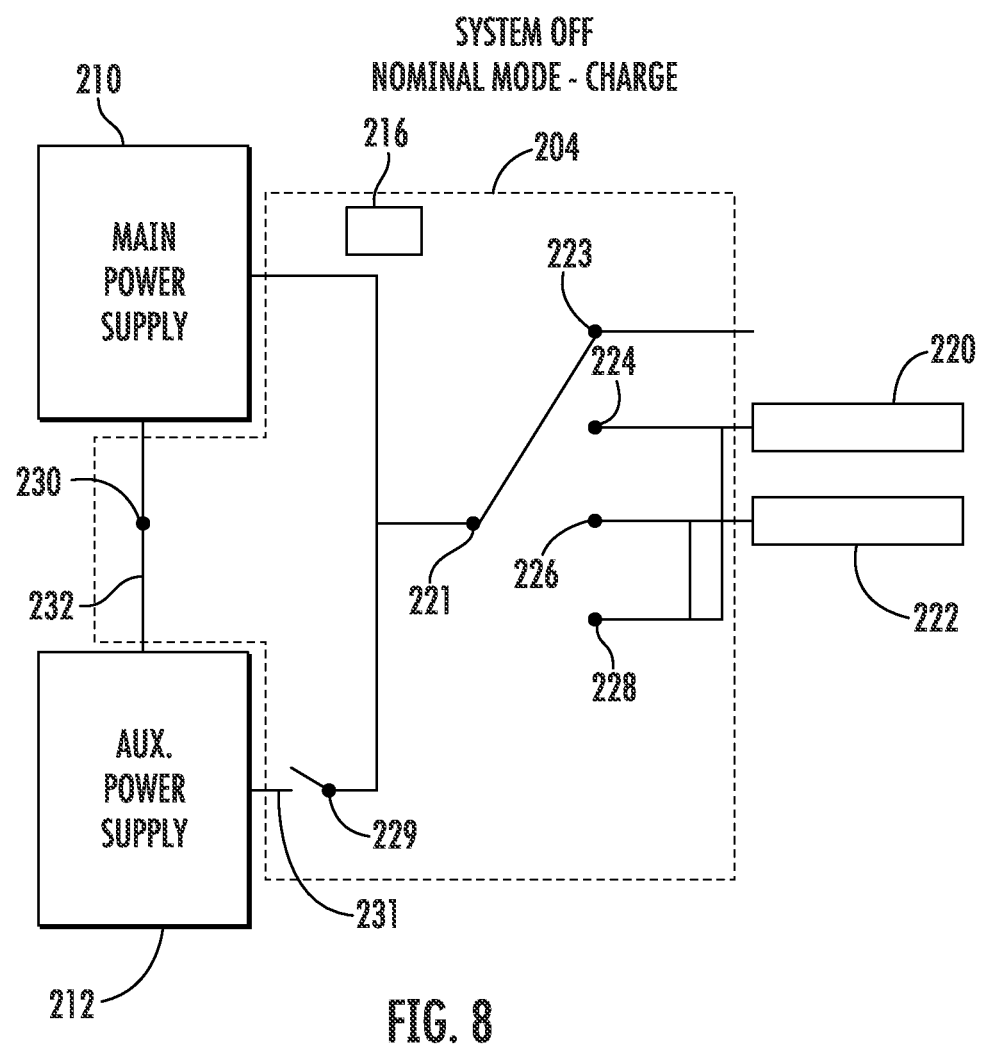
FIG. 8 is a schematic view of a power switching system in a nominal mode of operation in accordance with another exemplary aspect of the present disclosure.

FIG. 8 illustrates an operating scenario in which the power switching system is OFF such that no electrical power is provided to either of the first subset of electrical devices 220 and second subset of electrical devices 222. The switch 221 is moved to a position via the microcontroller 216 to make contact with electrical contact 223 which is a null electrical contact. No electrical power is conveyed from the main power supply 210 or the auxiliary power supply 212. Though the power switching system is OFF, the power switching system is operating in a mode in which the auxiliary power supply 212 is being charged as can be seen by the charge switch 230 moved to a position to make contact with charge electrical contact 232. In this configuration, the main power supply 210 supplies electrical power to the auxiliary power supply 212. The power switching system depicted in FIG. 8 is in a NOMINAL MODE-CHARGE state which indicates that the auxiliary power supply 212 is being charged.

Figure 9:
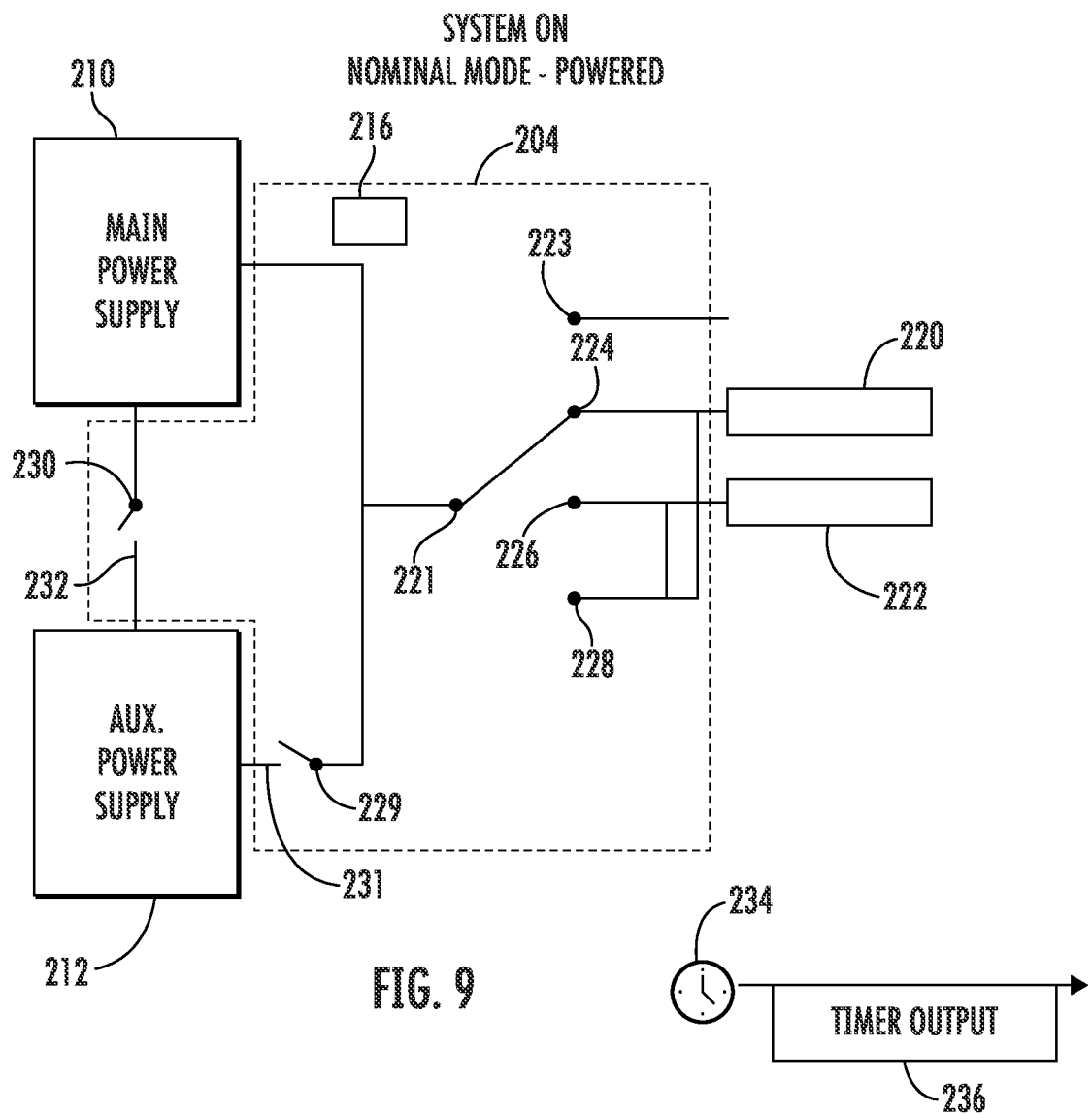
FIG. 9 is a schematic view of a power switching system in a nominal mode of operation in accordance with another exemplary aspect of the present disclosure.

FIG. 9 depicts the power switching system in an ON condition in which main electrical power from the main power supply 210 is delivered to the first subset of electrical devices 220. As discussed elsewhere herein, the switch 221 can be controlled by the microcontroller 216 to alternate between electrical contact 224 and electrical contact 226. The auxiliary power supply 212 is not being charged by virtue of the position of charge switch 230 and is not supplying auxiliary electrical power by virtue of the position of the auxiliary disconnect switch 229. The power switching system depicted in FIG. 8 is in a NOMINAL MODE-POWERED state which indicates that at least one electrical device 202 is receiving electrical power via contact with either of electrical contact 224 and electrical contact 226. The configuration of the electrical contacts 224 and 226 relative to the switch 221 provide the ability for the power controller 204 to inhibit the supply of electrical power to one subset of electrical devices while another of the subset of electrical devices is receiving electrical power.

FIG. 9 also depicts a timer 234 useful to provide a timer output 236. The timer 234 can be performed by the microcontroller 216 and provided internal to the microcontroller 216 for purposes of determining when to alternate providing main electrical power from the main power supply 210 to each of the first subset of electrical devices 220 and second subset of electrical devices 222 (akin to the alternating discussion above with respect to FIG. 3). The microcontroller 216 can be used to regulate the switch 221 according to the timer output 236. For example, if the microcontroller 216 is configured to alternate after an elapsed time of 1 minute, then once the timer output has reached one minute the microcontroller 216 can regulate the configuration of switch 221 to change from electrical contact 224 to electrical contact 226. After a subsequent minute has been reached, the microcontroller 216 can regulate the configuration of switch 221 to change from electrical contact 226 to electrical contact 224. The timer 234 and timer output 236 can also be present on any other embodiment described herein which uses the alternating powering of electrical devices 202, whether alternating when only one subset is energized (as also in FIG. 10), or alternating between the main power supply 210 and auxiliary power supply 212 to separately power the first subset of electrical devices 220 and second subset of electrical devices 222 as shown below in one embodiment of FIGS. 14 and 15.

Figure 10:
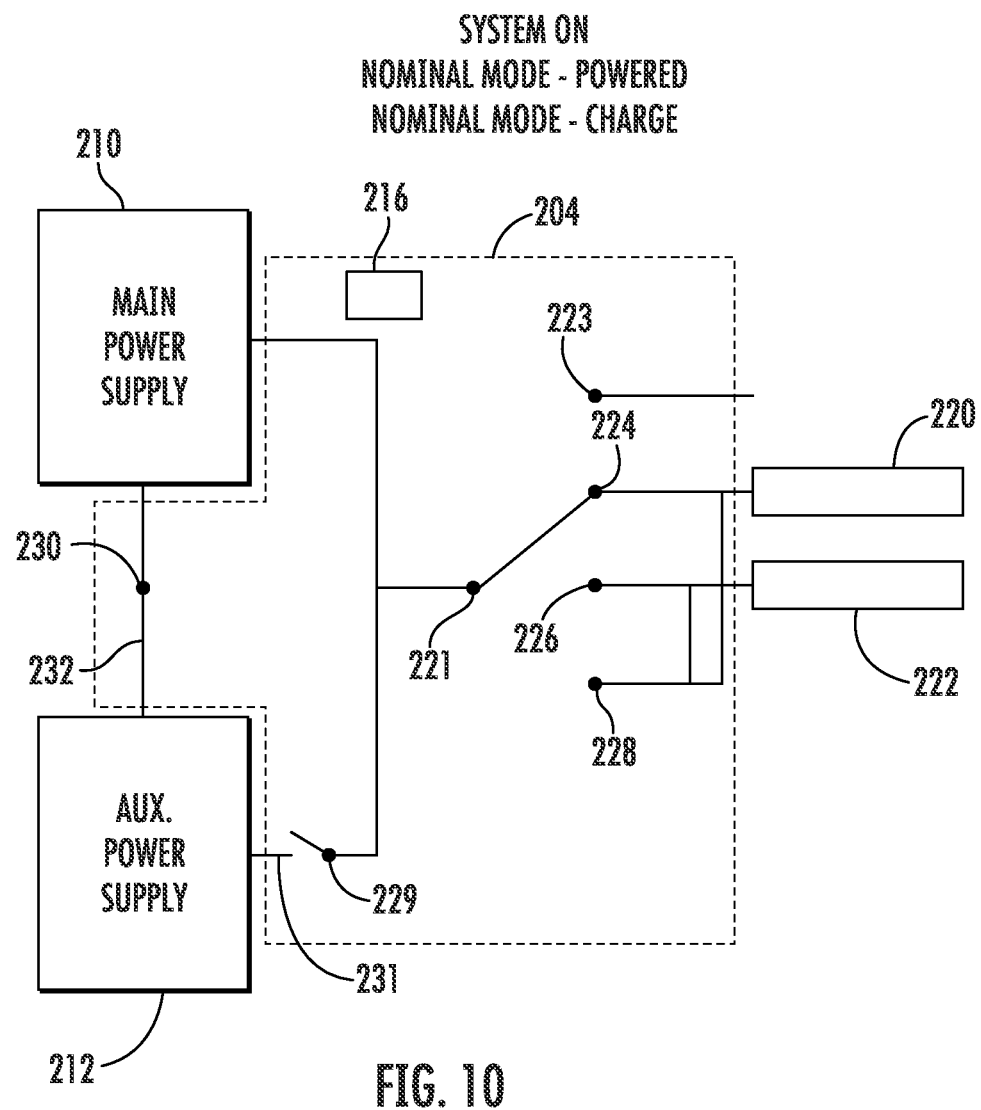
FIG. 10 is a schematic view of a power switching system in a nominal mode of operation in accordance with another exemplary aspect of the present disclosure.

FIG. 10 depicts an operation of the power switching system similar to FIG. 9 but in which the auxiliary power supply 212 is being charged by the main power supply 210. The power switching system is in an ON configuration, with a NOMINAL MODE-POWERED which indicates that at least one of the first subset of electrical devices 220 and second subset of electrical devices 222 is being energized, and a NOMINAL MODE-CHARGED which indicates that the auxiliary power supply 212 is receiving main electrical power from the main power supply 210. It will be appreciated that NOMINAL MODE is a mode in which the system is behaving nominally with main electrical power being used to energize one or other of the first subset of electrical devices 220 and second subset of electrical devices 222, whether or not the auxiliary power supply 212 is being charged or not.

Figure 11:
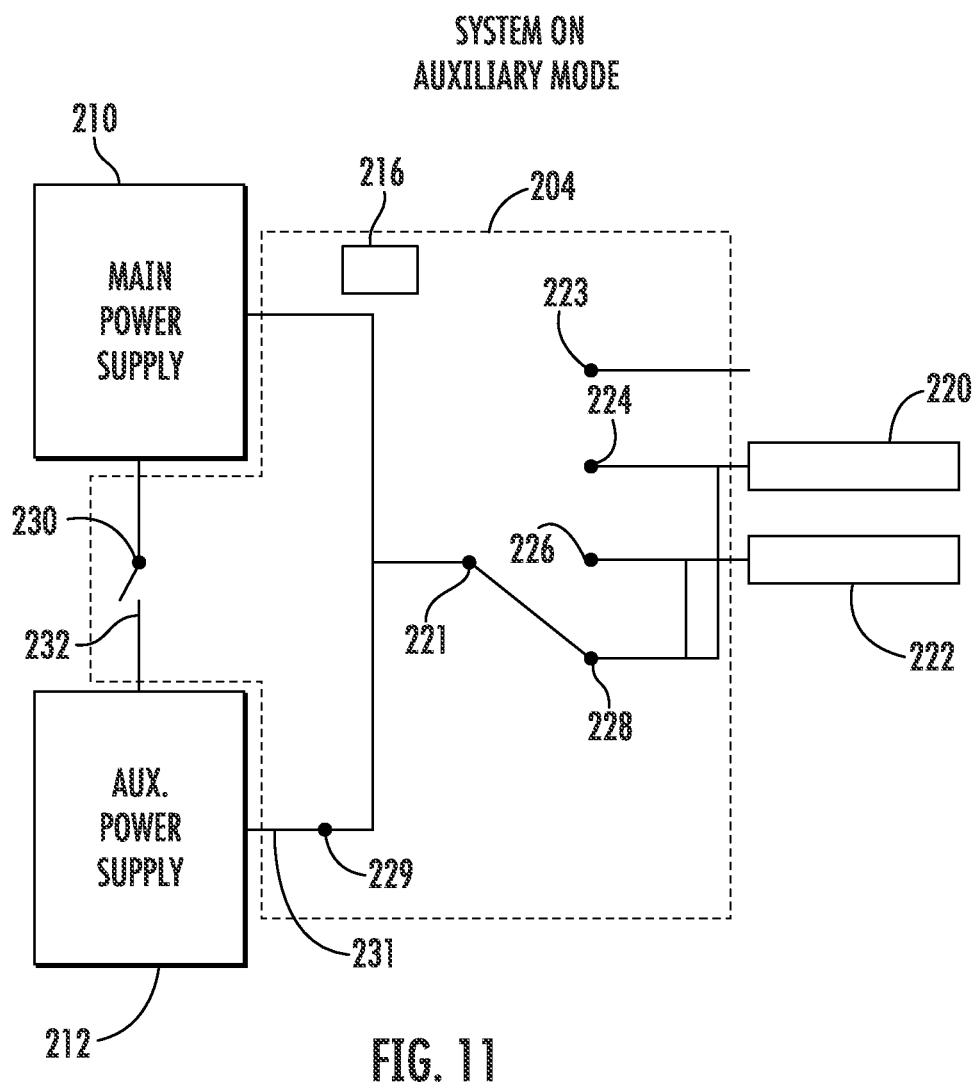
FIG. 11 is a schematic view of a power switching system in an auxiliary mode of operation in accordance with another exemplary aspect of the present disclosure.

FIG. 11 depicts an operation of the power switching system in which the system is in an ON configuration, but is in AUXILIARY MODE. The microcontroller 216 has regulated the orientation of the switch 230 to disconnect the auxiliary power supply from the main power supply 210, and regulate the configuration of the main selector switch 221 to contact electrical contact 228. Electrical contact 228 is wired to a configuration in which the first subset of electrical devices 220 and second subset of electrical devices 222 are in parallel electrical connection as can be seen in any of FIGS. 7-11. In the configuration depicted in FIG. 11, main electrical power from the main power supply 210 and auxiliary electrical power from the auxiliary power supply 212 is used to collectively power both of the first subset of electrical devices 220 and second subset of electrical devices 222 at the same time. If a timer is present in the embodiment, the timer can be inhibited to either stop timing, or the microcontroller 216 can be configured to ignore the timer output since there is no need to alternate between the first subset of electrical devices 220 and second subset of electrical devices 222.

Figure 12:
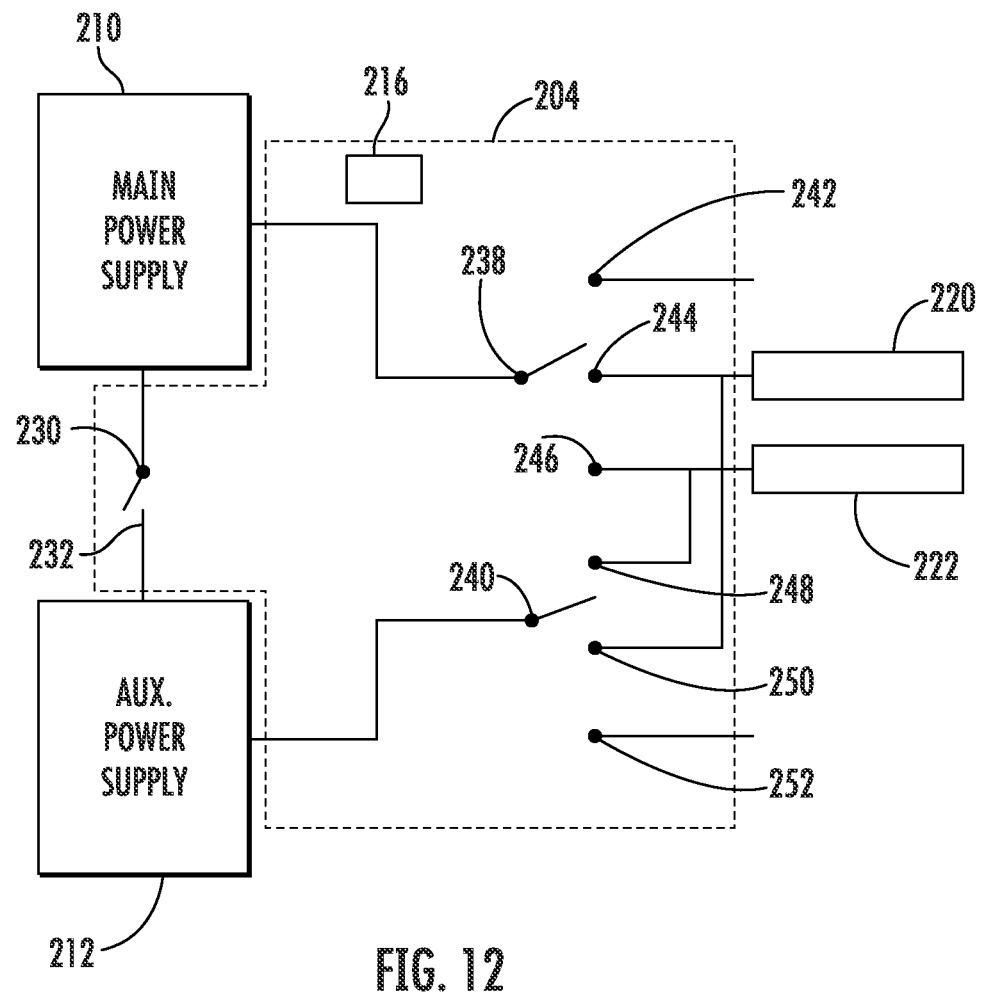
FIG. 12 is a schematic view of another embodiment of a power switching system having a power controller in accordance with another exemplary aspect of the present disclosure.

Turning now to FIGS. 12-16, further details of the power controller 204 are depicted in which the main power supply 210 and auxiliary power supply 212 are arranged to separately provide electrical power to the first subset of electrical devices 220 and second subset of electrical devices 222. The switch 214 represented schematically in FIG. 6 is broadly representative of switches 230, 238, and 240, all of which can be regulated by the microcontroller 216. A main power selector switch 238 can be used to provide main electrical power from the main power supply 210. An auxiliary power selector switch 240 can be used to provide auxiliary electrical power from the auxiliary power supply 212. Electrical contacts 242-246 are used in conjunction with the main power selector switch 238 to place the main power supply 210 in electrical communication with either of the first subset of electrical devices 220 and second subset of electrical devices 222. Electrical contacts 248-252 are used in conjunction with the auxiliary power selector switch 240 to place the auxiliary power supply 212 in electrical communication with either of the first subset of electrical devices 220 and second subset of electrical devices 222. A charge switch 230 is provided which can make contact with charge electrical contact 232 to charge the auxiliary power supply 212. The auxiliary power supply 212 can be charged, in some embodiments, when the main power supply 210 is not provided power to any of the electrical devices 220 and 222. In embodiments in which the main power supply is capable of providing excess power beyond that required to excite the electrical devices as in FIG. 3, the auxiliary power supply 212 can be charged during the alternating operation as in FIG. 3. Further operating scenarios of the embodiment depicted in FIG. 12 are described further below in FIGS. 13-16.

Figure 13:
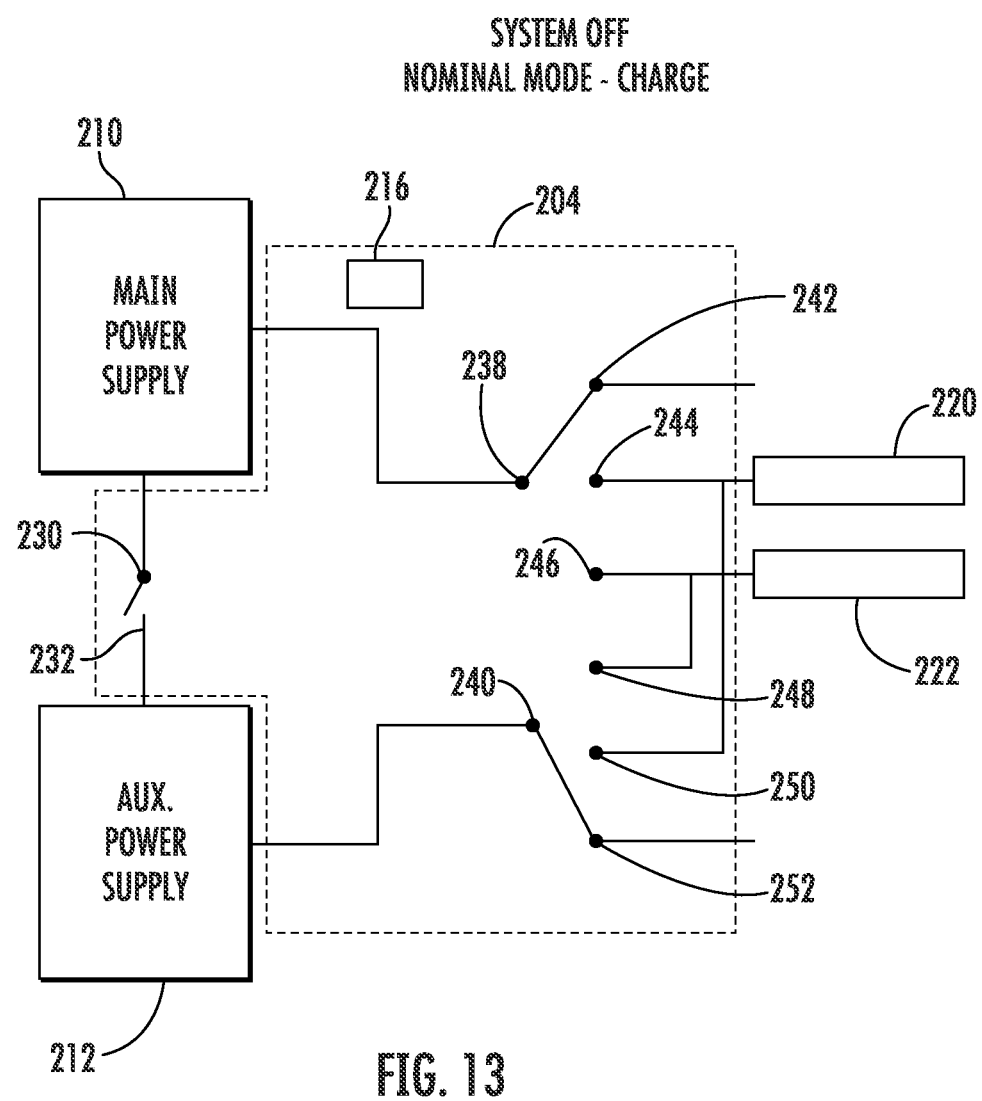
FIG. 13 is a schematic view of another embodiment of a power switching system in a nominal mode of operation in accordance with another exemplary aspect of the present disclosure.

FIG. 13 illustrates an operating scenario in which the power switching system is OFF such that no electrical power is provided to either of the first subset of electrical devices 220 and second subset of electrical devices 222. Switches 238 and 240 are moved to a position via the microcontroller 216 to make contact with electrical contacts 242 and 252, respectively, which are null electrical contacts. No electrical power is conveyed from the main power supply 210 or the auxiliary power supply 212 to either of the first subset of electrical devices 220 or the second subset of electrical devices 222. Though the power switching system is OFF, the power switching system is operating in a mode in which the auxiliary power supply 212 is being charged as can be seen by the charge switch 230 moved to a position to make contact with charge electrical contact 232. In this configuration, the main power supply 210 supplies electrical power to the auxiliary power supply 212. The power switching system depicted in FIG. 13 is in a NOMINAL MODE-CHARGE state which indicates that the auxiliary power supply 212 is being charged.

Figure 14:
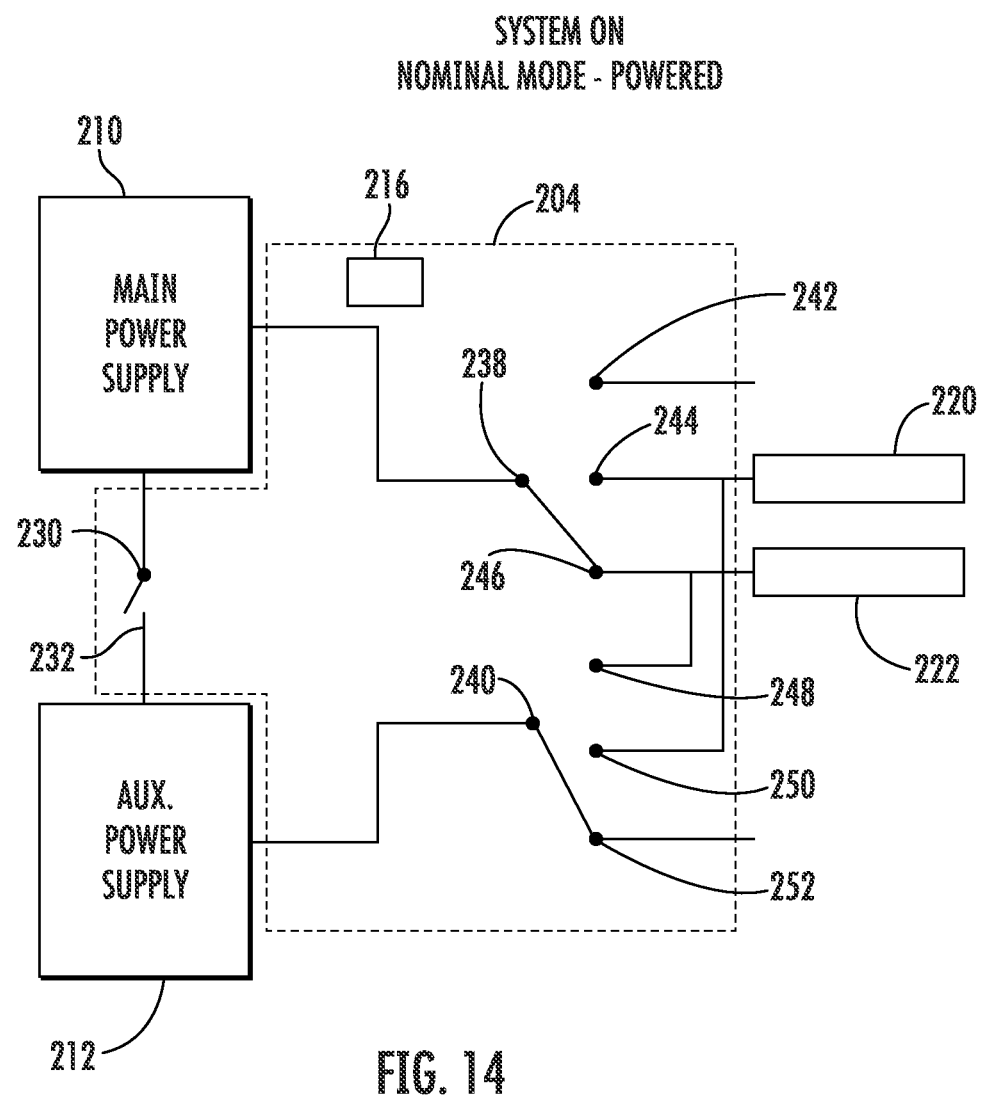
FIG. 14 is a schematic view of another embodiment of a power switching system in a nominal mode of operation in accordance with another exemplary aspect of the present disclosure.

FIG. 14 depicts the power switching system in an ON condition in which main electrical power from the main power supply 210 is delivered to the first subset of electrical devices 220, and in which main electrical power from the main power supply 210 can also be delivered to the second subset of electrical devices 222 via alternating contact of switch 238 with electrical contact 244 and electrical contact 246. As discussed elsewhere herein, the switch 238 can be controlled by the microcontroller 216 to alternate between electrical contact 244 and electrical contact 246. The auxiliary power supply 212 is not being charged by virtue of the position of charge switch 230 and is not supplying auxiliary electrical power by virtue of the position of the auxiliary disconnect switch 229. The power switching system depicted in FIG. 14 is in a NOMINAL MODE-POWERED state which indicates that at least one electrical device 202 is receiving electrical power. The configuration of the electrical contacts 244 and 246 relative to the switch 238 provide the ability for the power controller 204 to inhibit the supply of main electrical power to one subset of electrical devices while another of the subset of electrical devices is receiving electrical power. Further, the power controller 204 can be configured to inhibit the supply of auxiliary electrical power from the auxiliary power supply 212 by preventing the switch 240 from changing its position from contacting the electrical contact 252.

Though the illustrated embodiment in FIG. 14 does not depict a timer 234 that is depicted in FIG. 9, it will be appreciated that an alternative embodiment of FIG. 14 can include the timer. In that alternative embodiment, the microcontroller 216 can be used to regulate the switch 238 according to the timer output 236. For example, if the microcontroller 216 is configured to alternate after an elapsed time of 1 minute, then once the timer output has reached one minute the microcontroller 216 can regulate the configuration of switch 238 to change from electrical contact 246 to electrical contact 244. After a subsequent minute has been reached, the microcontroller 216 can regulate the configuration of switch 238 to change from electrical contact 244 to electrical contact 246.

Figure 15:
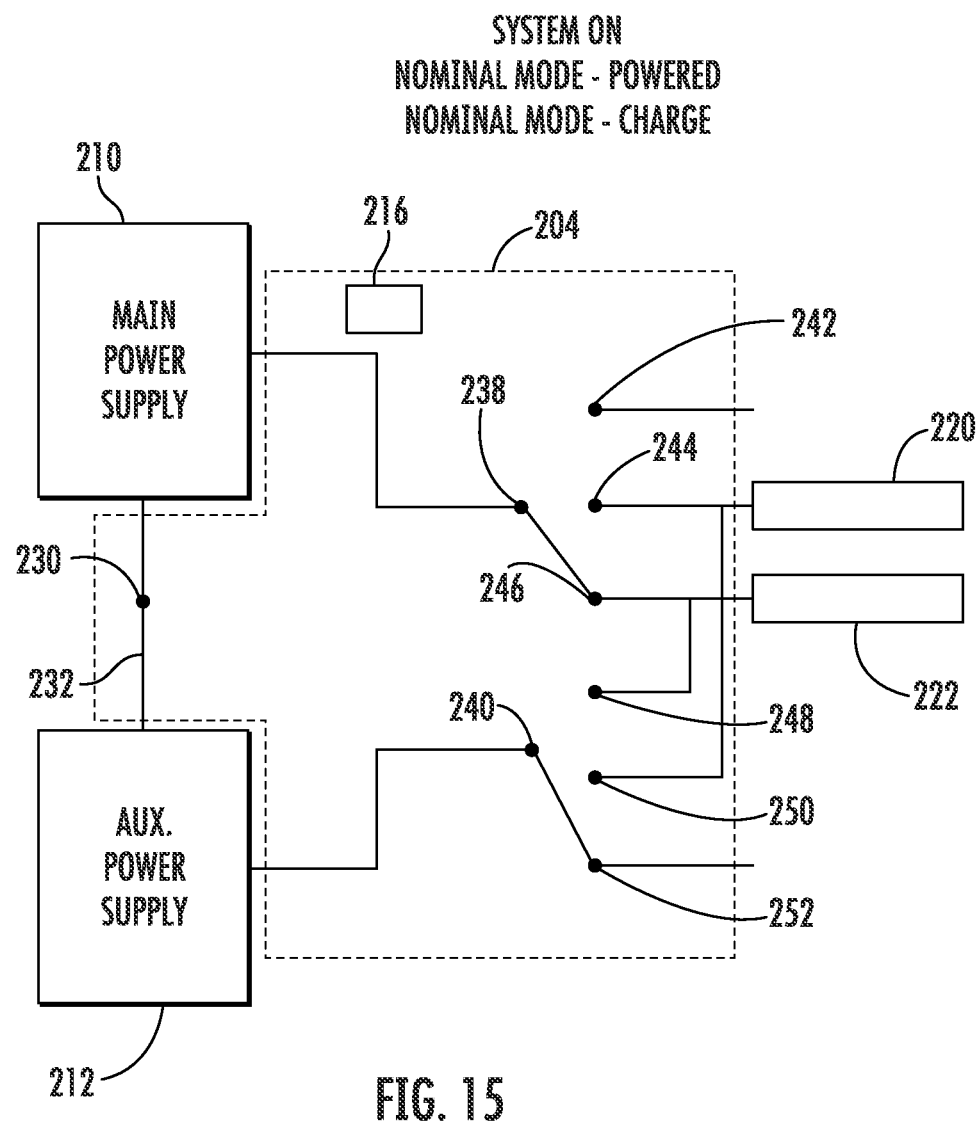
FIG. 15 is a schematic view of another embodiment of a power switching system in a nominal mode of operation in accordance with another exemplary aspect of the present disclosure.

FIG. 15 depicts an operation of the power switching system similar to FIG. 14 but in which the auxiliary power supply 212 is being charged by the main power supply 210. The power switching system is in an ON configuration, with a NOMINAL MODE-POWERED which indicates that at least one of the first subset of electrical devices 220 and second subset of electrical devices 222 is being energized, and a NOMINAL MODE-CHARGED which indicates that the auxiliary power supply 212 is receiving main electrical power from the main power supply 210. It will be appreciated that NOMINAL MODE is a mode in which the system is behaving nominally with main electrical power being used to energize one or other of the first subset of electrical devices 220 and second subset of electrical devices 222, whether or not the auxiliary power supply 212 is being charged or not.

Figure 16:
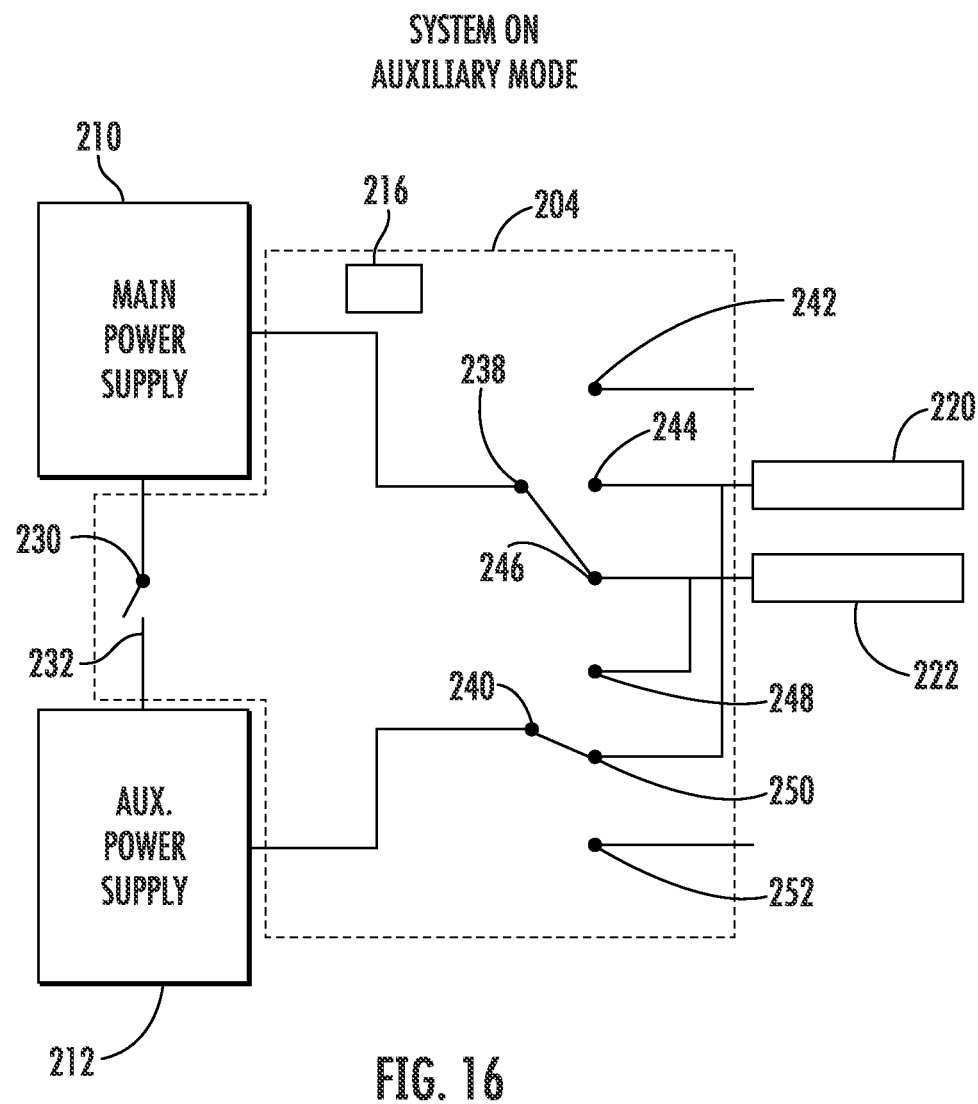
FIG. 16 is a schematic view of another embodiment of a power switching system in an auxiliary mode of operation in accordance with another exemplary aspect of the present disclosure.

FIG. 16 depicts an operation of the power switching system in which the system is in an ON configuration, but is in AUXILIARY MODE. The microcontroller 216 has regulated the orientation of the switch 230 to disconnect the auxiliary power supply from the main power supply 210, and regulate the configuration of the main power selector switch 238 to contact either of electrical contact 244 or 246, while also regulating the configuration of auxiliary electrical contact switch 240 to contact either of electrical contact 248 and electrical contact 250. The microcontroller 216 can be configured to ensure that the main power selector switch 238 contacts the electrical contact 244 or the electrical contact 246 to supply power to either of the first subset of electrical devices 220 or second subset of electrical devices 222 while the configuration of the switch 240 provides to the other of the first subset of electrical devices 220 or second subset of electrical devices 222. In the configuration depicted in FIG. 16, main electrical power from the main power supply 210 and auxiliary electrical power from the auxiliary power supply 212 is used to separately power the first subset of electrical devices 220 and second subset of electrical devices 222 at the same time. The power controller 204 can be configured such that switch 238 and switch 240 are controlled by the microcontroller 216 to ensure that power is inhibited from being delivered by both main power supply 210 and auxiliary power supply 212 at the same time to one of the electrical device 220 or electrical device 222.

If a timer is present in the embodiment, the timer can be inhibited to either stop timing, or the microcontroller 216 can be configured to ignore the timer output since there is no need to alternate between the first subset of electrical devices 220 and second subset of electrical devices 222, or the microcontroller 216 can be configured to alternate the configuration of switches 238 and 240 while ensuring that the main power supply 210 and auxiliary power supply 212 separately power each of the first subset of electrical devices 220 and second subset of electrical devices 222.

With any of the embodiments depicted above, an indication can be provided in the cockpit, driven by the power controller 204 or other controller, as to the health and/or status of the power switching system. For example, an indication can be provided in a cockpit display that is responsive to the power controller 204 indicating that the auxiliary power supply 212 is being charged, or that the auxiliary power supply 212 is fully charged and available for AUXILIARY MODE.

Figure 17:
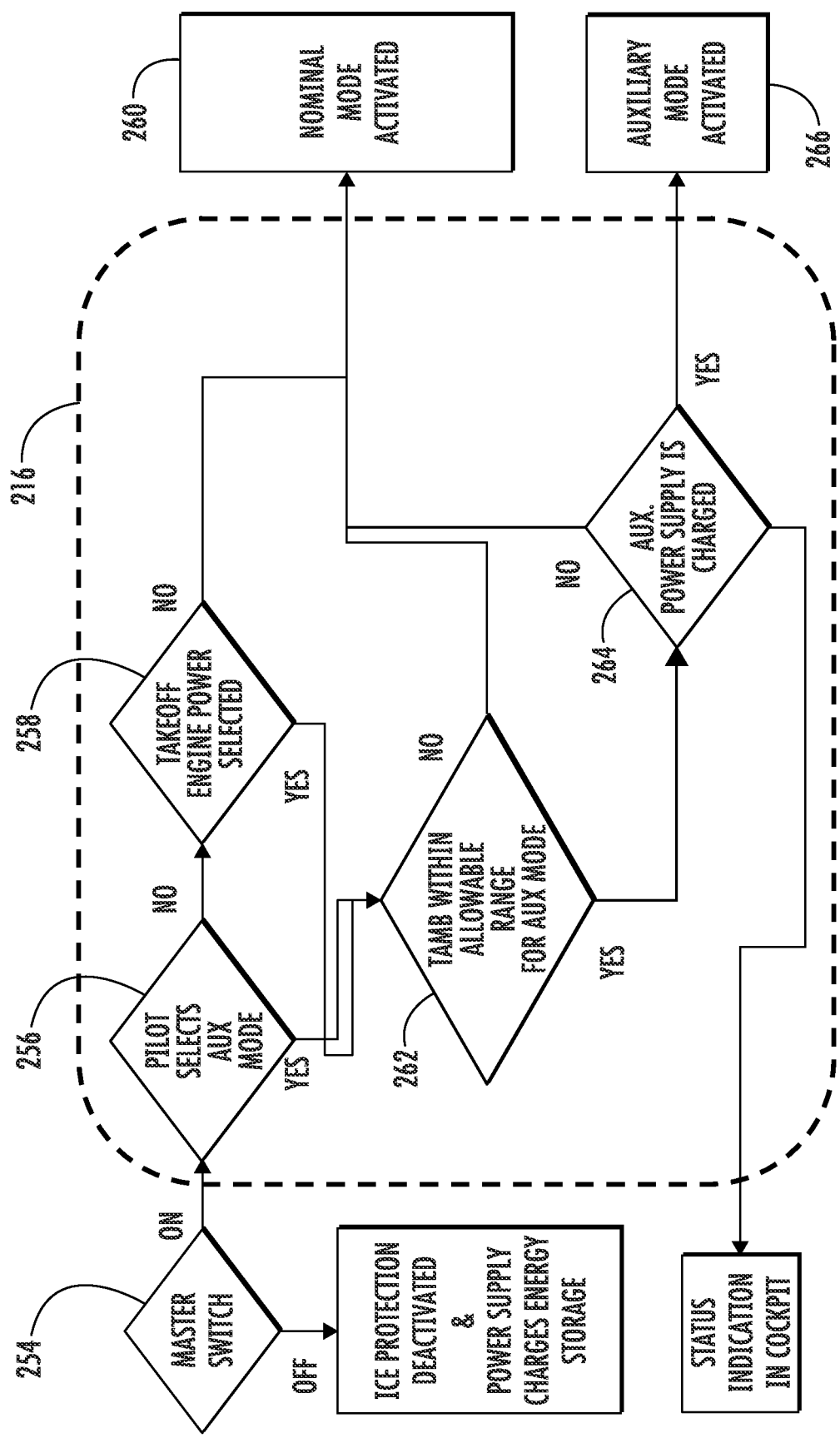
FIG. 17 is a logic flow of an embodiment of a power switching system in accordance with another exemplary aspect of the present disclosure.

Turning now to FIG. 17, one embodiment of logic configured in the microcontroller 216 (or configured elsewhere for use in controlling the switches 214) is depicted. In the illustrated embodiment of FIG. 17, the power switching system can be enabled by first activating a master switch 254, where such activation can be by a manual action by a user (e.g., a pilot), or can be an automated action (e.g., by the engine controller 200). If the master switch 254 is placed in an OFF position, the power switching system remains OFF, and no electrical power is provided to the first subset of electrical devices 220 and second subset of electrical devices 222 for ice protection. The master switch 254 can provide independent electrical power to the any of the variety of switches 221, 230, 238, and 240, while in another form the power controller 204 provides electrical power to the switches 221, 230, 238, and 240. It will be appreciated that providing power to the switches 221, 230, 238, and 240 can be separate and apart from controlling the position of the switches 221, 230, 238, and 240. Alternatively and/or additionally to the above, the master switch can control power provided to the power controller 204, which in turn, provides power to the various switches 221, 230, 238, and 240. In other embodiments, the position of the master switch 254 can be provided in the input 218 to the power controller 204 for use by the power controller 204 in supplying power to the switches 221, 230, 238, and 240. Regardless of whether the master switch 254 is directly connected to providing power to any of switches 221, 230, 238, and 240, when the master switch 254 is placed in the ON position, the power switching system can be placed in the ON condition as illustrated in FIGS. 9-11 and FIGS. 14-16.

The power controller 204 can also receive indication whether a user (e.g., a pilot) has selected the AUXILIARY MODE, where such indication can be provided, for example, via the input 218. If the microcontroller 216 determines, at decision block 256, through inspection of the input 218 that the pilot has not selected the AUXILIARY MODE, the logic in FIG. 17 moves to decision block 258 to determine whether takeoff power has been selected. As with the indication of AUXILIARY MODE via input 218, the power controller 204 can receive either a discrete indication that takeoff power has been selected via input 218, or can receive the power level via input 218 and determine, based on the power level, whether takeoff power has been selected. Although decision block 258 is illustrated with respect to takeoff power, it will be appreciated that other decision logic can be implemented in decision block 258 that influences whether the power switching system is configured to operate in NOMINAL MODE or AUXILIARY MODE.

If, at decision block 258, the microcontroller 216 determines that takeoff power has not been selected, the microcontroller activates NOMINAL MODE at block 260 which can be represented by any of FIGS. 9, 10, 14, and 15. Thus, one logic flow of FIG. 17 dictates that the power switching system be placed in NOMINAL MODE if the master switch 254 is ON, the pilot has not selected AUXILARY MODE, and the microcontroller 216 has not detected takeoff power selected.

At decision block 262, if the pilot had selected AUXILIARY MODE as determined at decision block 256, the logic flow of FIG. 17 will proceed to inspect the ambient temperature, which can be provided via input 218, to determine whether the temperature is within an allowable range for AUXILIARY MODE. If the temperature is not within the allowable range, then the logic flow of FIG. 17 moves to block 260 and the microcontroller 216 will place the system in NOMINAL MODE. In some embodiments, instead of a range of acceptable conditions, the decision block 262 may instead include a limitation such as a one sided inequality (e.g., if the ambient temperature is less than). If the limitation is not satisfied, the logic flow of FIG. 17 moves to block 260. In summary, yet another logic flow of FIG. 17 dictates that the power switching system be placed in NOMINAL MODE if the master switch 254 is ON even if the user (e.g., a pilot) selects AUXILIARY MODE since the condition data via input 218 do not support use of AUXILIARY MODE given that ambient temperature is not within an allowable range.

If, at decision block 258, takeoff power had been selected, the logic flow of FIG. 17 moves to decision block 262 to determine whether the operating limitation is satisfied, which, in the illustrated embodiment, is whether ambient temperature is within allowable limits. If the limitation is not satisfied, the logic flow of FIG. 17 moves to block 260. In summary, yet another logic flow of FIG. 17 dictates that the power switching system be placed in NOMINAL MODE if the master switch 254 is ON, the user has not selected AUXILIARY MODE, yet the condition data via input 218 indicates that takeoff power is selected, but further condition data via the input 218 does not support use of AUXILIARY MODE given that ambient temperature is not within an allowable range. This particular logic flow acts as a further check on an automated change to AUXILIARY MODE given the flight critical phase of takeoff despite the user not selecting AUXILIARY MODE, by checking whether temperature limits dictate the need to power the first subset of electrical devices 220 and second subset of electrical devices 222.

At decision block 262, if the ambient temperature is within an allowable range, the logic flow of FIG. 17 proceeds to decision block 264 to determine whether the auxiliary power supply 212 is charged to a sufficient level. Such a check at block 264 can be accomplished by inspecting a discrete indication provided to the power controller 204 via input 218 (e.g., a discrete that indicates a sufficient charge with a '1' indication, or an insufficient charge with a '0' indication), or by inspecting a state of charge provided via the input 218 and comparing the state of charge to a limitation. For example, if the power controller 204, via the microcontroller 216, includes a limitation of 95% to satisfy the block 264 as being sufficiently charged, then if the state of charge received via the input 218 satisfies the limitation (e.g., either greater than or greater than/equal to 95%), the decision block 264 proceeds to block 266 in which AUXILIARY MODE is activated. In summary, yet another logic flow of FIG. 17 dictates that the power switching system be placed in AUXILIARY MODE if the master switch 254 is ON, the user has either selected AUXILIARY MODE or the microcontroller 216 determines that takeoff power is selected despite the user not selecting AUXILIARY MODE, the ambient temperature range is satisfied, and the auxiliary power supply 212 is sufficiently charged.

If decision block 264 determines that the auxiliary power supply 212 includes an insufficient charge, then the decision block 264 moves to block 260 in which the NOMINAL MODE is activated. In summary, yet another logic flow of FIG. 17 dictates that the power switching system be placed in NOMINAL MODE if the master switch 254 is ON, even if the user has either selected AUXILIARY MODE or the microcontroller 216 determines that takeoff power is selected despite the user not selecting AUXILIARY MODE, the ambient temperature range is satisfied, but the auxiliary power supply 212 is not sufficiently charged.

Figure 18:
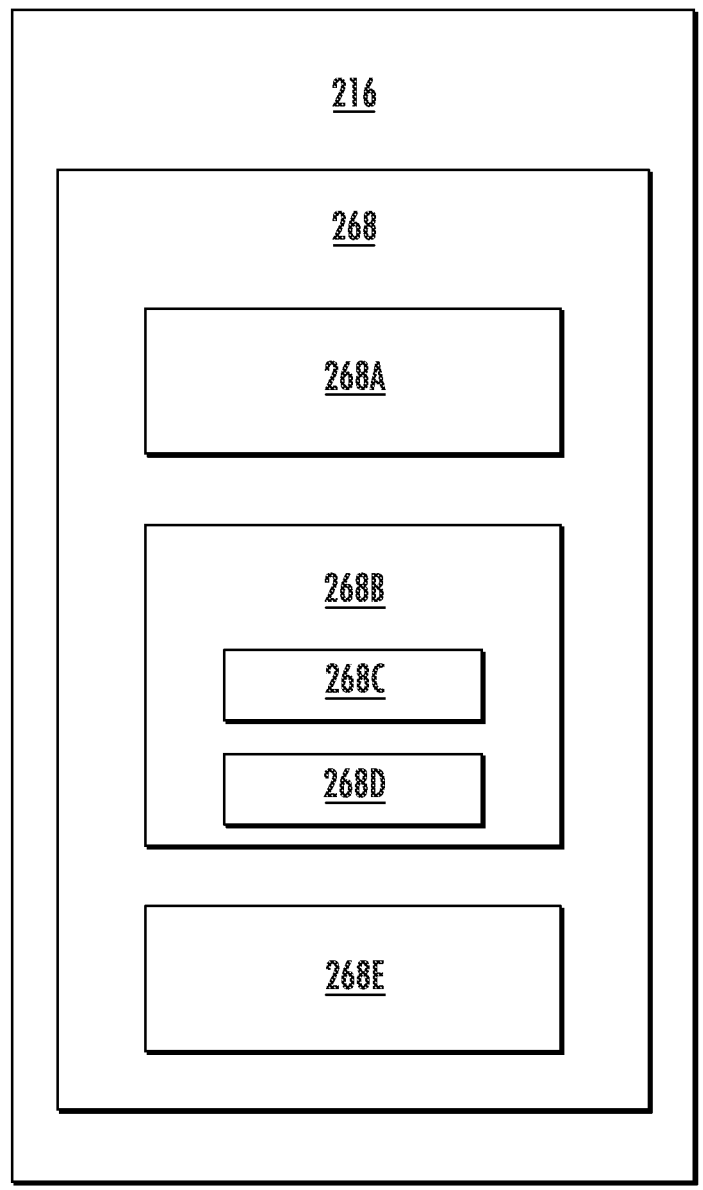
FIG. 18 is a schematic view of a computing device in accordance with another exemplary aspect of the present disclosure.

Turning now to FIG. 18, any of the controllers described herein (e.g., the engine controller 200, the power controller 204, or the microcontroller 216) can be implemented using a computing device 268, one embodiment of which is illustrated in FIG. 18. For purposes of illustration, FIG. 18 depicts the microcontroller 216, but the description is applicable to any other controller discussed herein. The computing device(s) 268 can include one or more processor(s) 268A and one or more memory device(s) 268B. The one or more processor(s) 268A can include any suitable processing device, such as a microprocessor, microcontroller, integrated circuit, logic device, and/or other suitable processing device. The one or more memory device(s) 268B can include one or more computer-readable media, including, but not limited to, non-transitory computer-readable media, RAM, ROM, hard drives, flash drives, and/or other memory devices.

The one or more memory device(s) 268B can store information accessible by the one or more processor(s) 268A, including computer-readable instructions 268C that can be executed by the one or more processor(s) 268A. The instructions 268C can be any set of instructions that when executed by the one or more processor(s) 268A, cause the one or more processor(s) 268A to perform operations. In some embodiments, the instructions 268C can be executed by the one or more processor(s) 268A to cause the one or more processor(s) 268A to perform operations, such as any of the operations and functions for which the controller and/or the computing device(s) 268 are configured, the operations for any of the aforementioned systems as described herein, and/or any other operations or functions of the one or more computing device(s) 268 (e.g., as a full authority digital engine controller). The instructions 268C can be software written in any suitable programming language or can be implemented in hardware. Additionally, and/or alternatively, the instructions 268C can be executed in logically and/or virtually separate threads on the one or more processor(s) 268A. The one or more memory device(s) 268B can further store data 268D that can be accessed by the one or more processor(s) 268A. For example, the data 268D can include data indicative of outside air conditions, power flows, data indicative of engine/aircraft operating conditions, and/or any other data and/or information described herein.

The computing device(s) 268 can also include a network interface 268E used to communicate, for example, with the other components of the systems described herein (e.g., via a communication network). The network interface 268E can include any suitable components for interfacing with one or more network(s), including for example, transmitters, receivers, ports, controllers, antennas, and/or other suitable components. One or more devices can be configured to receive one or more commands from the computing device(s) 268 or provide one or more commands to the computing device(s) 268.

The network interface 268E can include any suitable components for interfacing with one or more network(s), including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Figure 19:
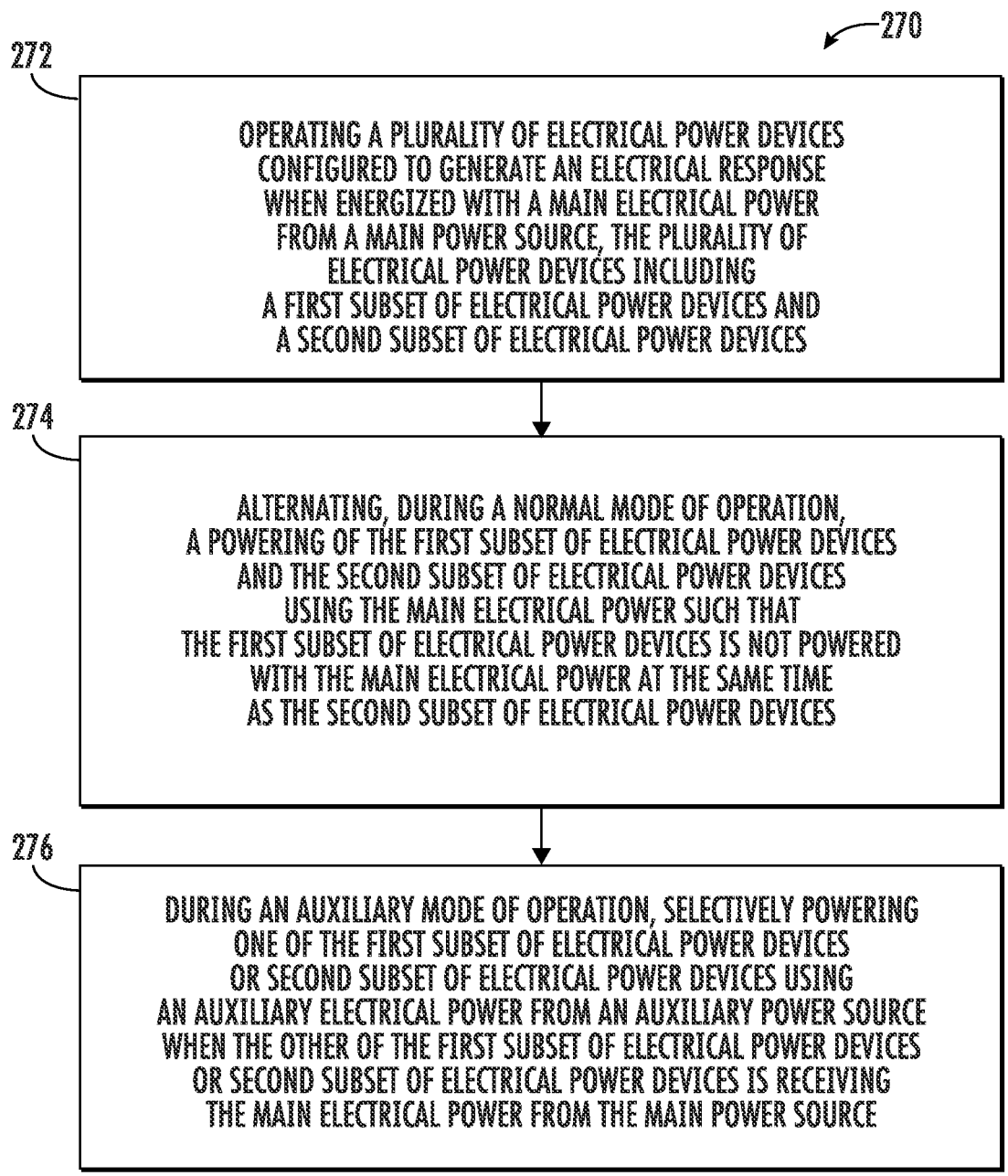
FIG. 19 is a flow chart describing a method for switching power in accordance with the present disclosure.

FIG. 19 discloses a method 270 for switching power which includes, at step 272, of operating a plurality of electrical power devices configured to generate an electrical response when energized with a main electrical power from a main power supply 210, the plurality of electrical devices 202 including a first subset of electrical devices 220 and a second subset of electrical devices 222. As mentioned above, the electrical devices can take any variety of forms including an electric heater, fluid pump, pneumatic pump, etc. Further, the first subset of electrical devices 220 can include the same or different number of electrical devices 202 as the second subset of electrical devices 222. At step 274, the method 270 further includes alternating, during a nominal mode of operation, a powering of the first subset of electrical devices 220 and the second subset of electrical devices 222 using the main electrical power such that the first subset of electrical devices 220 is not powered with the main electrical power at the same time as the second subset of electrical devices 222. At step 276, the method 270 further includes that during an auxiliary mode of operation, selectively powering one of the first subset of electrical devices 220 or second subset of electrical devices 222 using an auxiliary electrical power from an auxiliary power supply 212 when the other of the first subset of electrical devices 220 or second subset of electrical devices 222 is receiving the main electrical power from the main power supply 210.

The method 270 can include further steps including operating a prime mover configured as a propulsive power source for an aircraft 161, the prime mover including an open rotor 152 having a plurality of fan blades 154, each of the plurality of fan blades 154 including at least one electrical device 202 from the plurality of electrical power devices. The method 270 can further include that the alternating is based on a timer. Still further, the method 270 can include initiating the auxiliary mode of operation based on at least one of (1) a user input; (2) an operating condition of the open rotor; or (3) a command received by the power controller from another controller. Yet still further, the method 270 can include that the alternating is inhibited during the auxiliary mode of operation.

Embodiments of the present disclosure are useful to provide continuous heating during portions of operation of the gas turbine engine 100, such as during flight critical portions of operation. When in nominal use, the system can alternate use of a main electrical power with a first subset of electrical devices 220 and second subset of electrical devices to avoid exceeding an operational constraint such as a maximum current flow through an electrical device and/or exceeding a budgeted power draw from the gas turbine engine 100. When full use of the electrical devices 202 is needed, such as during a critical phase of flight, an auxiliary power supply can be used to provide additional electrical energy so that all electrical devices can be energized at the same time.

Further aspects are provided by the subject matter of the following clauses:

A power switching system, the power switching system comprising: a main power supply configured to provide a main electrical power; a plurality of electrical power devices configured to generate an electrical response when energized with the main electrical power, the plurality of electrical power devices including a first subset of electrical power devices and a second subset of electrical power devices; a power controller having a normal mode of operation structured to provide the main electrical power to the first subset of electrical power devices and to inhibit the main electrical power from being delivered to the second subset of electrical power devices when the main electrical power is provided to the first subset of electrical power devices; and an auxiliary power supply configured to provide an auxiliary electrical power; wherein the power controller further includes an auxiliary mode of operation structured to provide the main electrical power to the first subset of electrical power devices and to provide the auxiliary electrical power to the second subset of electrical power devices.

The power switching system of the preceding clause, wherein each one of the plurality of electrical power devices is the same as each other of the plurality of electrical power devices.

A power switching system, the power switching system comprising: a main power supply configured to provide a main electrical power; an auxiliary power supply configured to provide an auxiliary electrical power; a plurality of electrical power devices configured to generate an electrical response when energized with the main electrical power, the plurality of electrical power devices including a first subset of electrical power devices and a second subset of electrical power devices; and a power controller having a normal mode of operation and an auxiliary mode of operation, the normal mode of operation structured to prohibit the first subset of electrical power devices and second subset of electrical power devices from being energized, at the same time, with power from the main power supply, the auxiliary mode of operation structured to provide the main electrical power from the main power supply to the first subset of electrical devices at the same time that the auxiliary electrical power is provided from the auxiliary power supply to the second subset of electrical power devices.

The power switching system of the preceding claim, wherein if only one of the main electrical power or auxiliary electrical power is provided to either of the first subset of electrical power devices or the second subset of electrical power devices, the auxiliary mode of operation is structured to provide the main electrical power to the first subset of electrical power devices and to provide the auxiliary electrical power to the second subset of electrical power devices.

A power switching system for an anti-ice system, the power switching system comprising: a main power supply configured to provide a main electrical power; a plurality of electrical power devices electrically coupled with the main electrical power, each of the plurality of electrical power devices comprising a heating element configured to remove ice from an aircraft surface, the plurality of electrical power devices including a first subset of electrical power devices and a second subset of electrical power devices; a power controller having a normal mode of operation structured to provide the main electrical power to the first subset of electrical power devices and to inhibit the main electrical power from being delivered to the second subset of electrical power devices when the main electrical power is provided to the first subset of electrical power devices; and an auxiliary power supply configured to provide an auxiliary electrical power; wherein the power controller further includes an auxiliary mode of operation structured to provide either the main electrical power or the auxiliary electrical power, or both, to the first subset of electrical power devices and, at a same time, to provide either the main electrical power or the auxiliary electrical power, or both, to the second subset of electrical power devices.

The power switching system for an anti-ice system of the preceding claim, wherein if only one of the main electrical power or auxiliary electrical power is provided to either of the first subset of electrical power devices or the second subset of electrical power devices, the auxiliary mode of operation is structured to provide the main electrical power to the first subset of electrical power devices and to provide the auxiliary electrical power to the second subset of electrical power devices.

The power switching system for an anti-ice system of any preceding claim, wherein the plurality of electrical power devices are electric heaters.

The power switching system for an anti-ice system of any preceding claim, which further includes a prime mover configured as a propulsive power source for an aircraft.

The power switching system for an anti-ice system of any preceding claim, wherein the prime mover includes an open rotor, the open rotor having a plurality of open rotor blades each including at least one electrical power device of the plurality of electrical power devices.

The power switching system for an anti-ice system of any preceding claim, wherein the normal mode of operation is further configured to alternate between (1) a first configuration in which the power controller is structured to provide the main electrical power to the first subset of electrical power devices and to inhibit the main electrical power from being delivered to the second subset of electrical power devices; and (2) a second configuration in which the power controller is structured to provide the main electrical power to the second subset of electrical power devices and to inhibit the main electrical power from being delivered to the first subset of electrical power devices.

The power switching system for an anti-ice system of any preceding claim, wherein the normal mode of operation is further configured to alternate between the first configuration and the second configuration based on a timer, wherein the power controller is responsive to a timer output from the timer such that the power controller alternates, in the normal mode of operation, between the first configuration and the second configuration based on the timer output.

The power switching system for an anti-ice system of any preceding claim, wherein the power controller is structured to provide the main electrical power to the first subset of electrical power devices and to provide the auxiliary electrical power to the second subset of electrical power devices during an entirety of the auxiliary mode of operation.

A power switching system for an anti-ice system, the power switching system comprising: a main power supply configured to provide a main electrical power; an auxiliary power supply configured to provide an auxiliary electrical power; a plurality of electrical power devices electrically coupled with the main electrical power, each of the plurality of electrical power devices comprising a heating element configured to remove ice from an aircraft surface, the plurality of electrical power devices including a first subset of electrical power devices and a second subset of electrical power devices; and a power controller having a normal mode of operation and an auxiliary mode of operation, the normal mode of operation structured to prohibit the first subset of electrical power devices and second subset of electrical power devices from being energized, at a same time, with power from the main power supply, the auxiliary mode of operation structured to provide either the main electrical power or the auxiliary electrical power, or both, to the first subset of electrical power devices and, at a same time, to provide either the main electrical power or the auxiliary electrical power, or both, to the second subset of electrical power devices.

The power switching system for an anti-ice system of the preceding claim, which further includes a prime mover having an open rotor, the plurality of electrical power devices configured as electric heaters and structured to prevent ice formation on the open rotor.

The power switching system for an anti-ice system of any preceding claim, wherein the auxiliary mode of operation is initiated by at least one of (1) a user input; (2) an operating condition of the open rotor; or (3) a command received by the power controller from another controller.

The power switching system for an anti-ice system of any preceding claim, wherein the power controller is structured to receive an operating condition input and determine, based on the operating condition input, whether to operate in the normal mode of operation or the auxiliary mode of operation.

The power switching system for an anti-ice system of any preceding claim, wherein the operating condition input includes at least one of power level, ice detection, weight on wheels, landing gear lever position.

The power switching system for an anti-ice system of any preceding claim, wherein power level is at least one of power level angle, throttle position, propeller pitch setting, fuel/air mixture setting.

The power switching system for an anti-ice system of any preceding claim, wherein the normal mode includes (1) a NORMAL MODE-POWERED in which the first subset of electrical power devices and second subset of electrical power devices are prohibited from being energized, at the same time, with power from the main power supply, and (2) a NORMAL MODE-CHARGE in which the main electrical power is provided to the auxiliary power supply to charge the auxiliary power supply and in which the main electrical power is not provided to any of the plurality of electrical power devices.

A method for switching power for an anti-ice system, the method comprising: operating a plurality of electrical power devices configured to generate an electrical response when energized with a main electrical power from a main power supply to remove ice from an aircraft surface, the plurality of electrical power devices including a first subset of electrical power devices and a second subset of electrical power devices; alternating, during a nominal mode of operation, a powering of the first subset of electrical power devices and the second subset of electrical power devices using the main electrical power such that the first subset of electrical power devices is not powered with the main electrical power at a same time as the second subset of electrical power devices; and during an auxiliary mode of operation, selectively powering one of the first subset of electrical power devices or second subset of electrical power devices using an auxiliary electrical power from an auxiliary power supply when the other of the first subset of electrical power devices or second subset of electrical power devices is receiving the main electrical power from the main power supply.

The method of the preceding claim, which further includes operating a prime mover configured as a propulsive power source for an aircraft, the prime mover including an open rotor having a plurality of fan blades, each of the plurality of fan blades including at least one electrical power device from the plurality of electrical power devices.

The method of any preceding claim, wherein the alternating is based on a timer.

The method of any preceding claim, which further includes initiating the auxiliary mode of operation based on at least one of (1) a user input; (2) an operating condition of the open rotor; or (3) a command received by a power controller from another controller.

The method of any preceding claim, wherein the alternating is inhibited during the auxiliary mode of operation.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

I claim:

1. A power switching system for an anti-ice system, the power switching system comprising:
   a main power supply configured to provide a main electrical power;
   a plurality of electrical power devices electrically coupled with the main electrical power, each of the plurality of electrical power devices comprising a heating element configured to remove ice from an aircraft surface, the plurality of electrical power devices including a first subset of electrical power devices and a second subset of electrical power devices;
   a power controller having a normal mode of operation structured to provide the main electrical power to the first subset of electrical power devices and to inhibit the main electrical power from being delivered to the second subset of electrical power devices when the main electrical power is provided to the first subset of electrical power devices; and
   an auxiliary power supply configured to provide an auxiliary electrical power;
   wherein the power controller further includes an auxiliary mode of operation structured to provide either the main electrical power or the auxiliary electrical power, or both, to the first subset of electrical power devices and, at a same time, to provide either the main electrical power or the auxiliary electrical power, or both, to the second subset of electrical power devices.

2. The power switching system for an anti-ice system of claim 1, wherein if only one of the main electrical power or the auxiliary electrical power is provided to either of the first subset of electrical power devices or the second subset of electrical power devices, the auxiliary mode of operation is structured to provide the main electrical power to the first subset of electrical power devices and to provide the auxiliary electrical power to the second subset of electrical power devices.

3. The power switching system for an anti-ice system of claim 1, wherein the plurality of electrical power devices are electric heaters.

4. The power switching system for an anti-ice system of claim 1, which further includes a prime mover configured as a propulsive power source for an aircraft.

5. The power switching system for an anti-ice system of claim 4, wherein the prime mover includes an open rotor having a plurality of open rotor blades, each including at least one electrical power device of the plurality of electrical power devices.

6. The power switching system for an anti-ice system of claim 1, wherein the normal mode of operation is further configured to alternate between (1) a first configuration in which the power controller is structured to provide the main electrical power to the first subset of electrical power devices and to inhibit the main electrical power from being delivered to the second subset of electrical power devices; and (2) a second configuration in which the power controller is structured to provide the main electrical power to the second subset of electrical power devices and to inhibit the main electrical power from being delivered to the first subset of electrical power devices.

7. The power switching system for an anti-ice system of claim 6, wherein the normal mode of operation is further configured to alternate between the first configuration and the second configuration based on a timer, wherein the power controller is responsive to a timer output from the timer such that the power controller alternates, in the normal mode of operation, between the first configuration and the second configuration based on the timer output.

8. The power switching system for an anti-ice system of claim 1, wherein the power controller is structured to provide the main electrical power to the first subset of electrical power devices and to provide the auxiliary electrical power to the second subset of electrical power devices during an entirety of the auxiliary mode of operation.

9. A power switching system for an anti-ice system, the power switching system comprising:
- a main power supply configured to provide a main electrical power;
- an auxiliary power supply configured to provide an auxiliary electrical power;
- a plurality of electrical power devices electrically coupled with the main electrical power, each of the plurality of electrical power devices comprising a heating element configured to remove ice from an aircraft surface, the plurality of electrical power devices including a first subset of electrical power devices and a second subset of electrical power devices; and
- a power controller having a normal mode of operation and an auxiliary mode of operation, the normal mode of operation structured to prohibit the first subset of electrical power devices and the second subset of electrical power devices from being energized, at a same time, with power from the main power supply, the auxiliary mode of operation structured to provide either the main electrical power or the auxiliary electrical power, or both, to the first subset of electrical power devices and, at a same time, to provide either the main electrical power or the auxiliary electrical power, or both, to the second subset of electrical power devices.

10. The power switching system for an anti-ice system of claim 9, which further includes a prime mover having an open rotor, the plurality of electrical power devices configured as electric heaters and structured to prevent ice formation on the open rotor.

11. The power switching system for an anti-ice system of claim 10, wherein the auxiliary mode of operation is initiated by at least one of (1) a user input; (2) an operating condition of the open rotor; or (3) a command received by the power controller from another controller.

12. The power switching system for an anti-ice system of claim 9, wherein the power controller is structured to receive an operating condition input and determine, based on the operating condition input, whether to operate in the normal mode of operation or the auxiliary mode of operation.

13. The power switching system for an anti-ice system of claim 12, wherein the operating condition input includes at least one of power level, ice detection, weight on wheels, landing gear lever position.

14. The power switching system for an anti-ice system of claim 13, wherein power level is at least one of power level angle, throttle position, propeller pitch setting, fuel/air mixture setting.

15. The power switching system for an anti-ice system of claim 9, wherein the normal mode of operation includes (1) a NORMAL MODE-POWERED in which the first subset of electrical power devices and the second subset of electrical power devices are prohibited from being energized, at the same time, with power from the main power supply, and (2) a NORMAL MODE-CHARGE in which the main electrical power is provided to the auxiliary power supply to charge the auxiliary power supply and in which the main electrical power is not provided to any of the plurality of electrical power devices.

16. A method for switching power for an anti-ice system, the method comprising:
- operating a plurality of electrical power devices configured to generate an electrical response when energized with a main electrical power from a main power supply to remove ice from an aircraft surface, the plurality of electrical power devices including a first subset of electrical power devices and a second subset of electrical power devices;
- alternating, during a nominal mode of operation, a powering of the first subset of electrical power devices and the second subset of electrical power devices using the main electrical power such that the first subset of electrical power devices is not powered with the main electrical power at a same time as the second subset of electrical power devices; and
- during an auxiliary mode of operation, selectively powering one of the first subset of electrical power devices or the second subset of electrical power devices using an auxiliary electrical power from an auxiliary power supply when the other of the first subset of electrical power devices or the second subset of electrical power devices is receiving the main electrical power from the main power supply.

17. The method of claim 16, which further includes operating a prime mover configured as a propulsive power source for an aircraft, the prime mover including an open rotor having a plurality of fan blades, each of the plurality of fan blades including at least one electrical power device from the plurality of electrical power devices.

18. The method of claim 16, wherein the alternating is based on a timer.

19. The method of claim 16, which further includes initiating the auxiliary mode of operation based on at least one of (1) a user input; (2) an operating condition of the open rotor; or (3) a command received by a power controller from another controller.

20. The method of claim 19, wherein the alternating is inhibited during the auxiliary mode of operation.

* * * * *